(12) United States Patent
Rizvi et al.

(10) Patent No.: US 11,556,147 B2
(45) Date of Patent: Jan. 17, 2023

(54) MOUNT FOR A PERIPHERAL DEVICE

(71) Applicant: Razer (Asia-Pacific) Pte. Ltd., Singapore (SG)

(72) Inventors: Farrukh Raza Rizvi, Singapore (SG); Eugene Hanjie Wang, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 17/397,039

(22) Filed: Aug. 9, 2021

(65) Prior Publication Data

US 2022/0043477 A1 Feb. 10, 2022

(30) Foreign Application Priority Data

Aug. 10, 2020 (AU) ................................ 2020101742

(51) Int. Cl.
  *G03B 17/00* (2021.01)
  *G06F 1/16* (2006.01)
  *F16M 13/02* (2006.01)

(52) U.S. Cl.
  CPC ......... *G06F 1/1607* (2013.01); *F16M 13/022* (2013.01)

(58) Field of Classification Search
  CPC .... H04N 7/144; G03B 17/561; G06F 1/1607; F16M 13/022; F16M 11/22; F16M 11/00
  See application file for complete search history.

(56) References Cited

U.S. PATENT DOCUMENTS

| 1,208,344 | A | * | 12/1916 | McAll ................... F16M 13/02 248/166 |
| 4,085,915 | A | | 4/1978 | Song et al. |
| 4,763,151 | A | | 8/1988 | Klinger |
| 5,081,478 | A | | 1/1992 | Hayashida et al. |
| 5,230,490 | A | | 7/1993 | Sloop |

(Continued)

FOREIGN PATENT DOCUMENTS

| CN | 204005113 U | 12/2014 |
| CN | 210567136 U | 5/2020 |

(Continued)

OTHER PUBLICATIONS

Camera Brackets, Clamps & Accessories (http://www.videocentric.co.uk/product/camera-brackets-accessories/) in 6 pages.

*Primary Examiner* — Amy J. Sterling
(74) *Attorney, Agent, or Firm* — Polsinelli PC

(57) ABSTRACT

A mount for a peripheral device including a first plate having an opening; a second plate coupled to the first plate via a first hinged joint so as to be pivotable between a closed configuration and an open configuration; and a levelling plate disposed in the opening and coupled to the first plate via a second hinged joint so as to be pivotable between a flushed configuration and an angled-off configuration. The first hinged joint and the second hinged joint being parallel and at opposite portions of the first plate. A free end of the second plate in the closed configuration and a free end of the levelling plate in the flushed configuration are directed in opposite directions along the first plate. The levelling plate includes a socket structure to receive an attachment assembly for attaching the peripheral device to the levelling plate. The first plate includes a lip portion.

20 Claims, 13 Drawing Sheets

(56) References Cited

U.S. PATENT DOCUMENTS

| | | | | |
|---|---|---|---|---|
| 5,260,731 A | * | 11/1993 | Baker, Jr. | F16M 13/022 |
| | | | | 396/428 |
| 6,196,504 B1 | | 3/2001 | Lemke | |
| 6,474,615 B1 | * | 11/2002 | Simonen | B60R 11/04 |
| | | | | 396/428 |
| 6,663,066 B1 | * | 12/2003 | Hong | H04M 15/745 |
| | | | | 396/421 |
| 6,712,322 B2 | | 3/2004 | Nakatani | |
| 7,572,073 B2 | * | 8/2009 | Kenoyer | F16M 13/022 |
| | | | | 396/428 |
| 7,618,202 B2 | * | 11/2009 | Xiao | G06F 1/1607 |
| | | | | 396/428 |
| 7,841,784 B2 | * | 11/2010 | Elias | G03B 17/566 |
| | | | | 396/428 |
| 8,152,389 B1 | * | 4/2012 | Lammens | G03B 17/561 |
| | | | | 396/419 |
| 8,356,948 B2 | | 1/2013 | Onishi et al. | |
| 9,169,962 B2 | * | 10/2015 | Wang | F16M 11/14 |
| 9,201,291 B2 | * | 12/2015 | Jorgenson | G03B 17/561 |
| 11,174,985 B1 | * | 11/2021 | Koulopoulos | F16M 11/08 |
| 11,381,776 B2 | * | 7/2022 | Nimmo | H04N 7/144 |
| 2006/0170817 A1 | * | 8/2006 | Wu | H04N 5/2251 |
| | | | | 348/E5.025 |
| 2017/0068149 A1 | * | 3/2017 | Fromm | G03B 17/566 |

FOREIGN PATENT DOCUMENTS

| | | |
|---|---|---|
| GB | 2283830 B | 6/1997 |
| KR | 101383212 B1 | 4/2014 |

* cited by examiner

MOUNT FOR A PERIPHERAL DEVICE

CROSS REFERENCE TO RELATED APPLICATIONS

The present application claims the benefit of Australia innovation patent no. 2020101742 filed on 10 Aug. 2020, the entire contents of which are incorporated herein by reference for all purposes.

TECHNICAL FIELD

Various embodiments generally relate to a mount for a peripheral device, such as camera, microphone, illumination device, speaker etc.

BACKGROUND

As the society moves towards work from home arrangement and home based learning, the demand for video functions, which requires a web camera or a camera being set-up, has increased. Typically, the web camera is used for video call or video conferences whereby the web camera is used for just showing the face of the user. Therefore, in the market, most web camera comes with a either a built-in monitor mount or a built-in standing mount, which restrict the web camera to be either fixed to a monitor or to be placed standing on a surface. These web cameras are usually also fixed relative to the respective mounts. However, with more type of uses of video functions in the work from home arrangement and home based learning, for example, for demonstrating process, products, equipment, prototypes, or for showing movements, artwork, projects, etc., the user may require interchanging the positions of the web camera from being on a monitor, to being on a table, to being handheld during the same video session. Currently, none of the mount in the market permits the web camera to be effectively used in such scenario.

Similarly, the use of other peripheral devices such as microphones and illumination devices, have also evolved to require the user to interchange the positions of the microphones and/or illumination devices from being mounted to a monitor, to being on a table, to being handheld during the same session when used to complement the camera or alone. The mounts available in the market for such peripheral devices are also not effective for interchanging positions.

Accordingly, there is a need for a more versatile and effective mount for a peripheral device, such as a camera, a microphone, an illumination device etc., to facilitate quick interchanging of positioning and mounting of the peripheral device.

SUMMARY

According to various embodiments, there is provided a mount for a peripheral device. The mount may include a first plate having an opening going all the way through from a first surface of the first plate to a second surface of the first plate, wherein the first surface and the second surface may be opposite surfaces of the first plate. The mount may include a second plate coupled to the first plate via a first hinged joint in a manner so as to be pivotable between a closed configuration and an open configuration in a clamshell like manner, whereby the second plate may be closed onto the second surface of the first plate in the closed configuration and the second plate may be pivoted away from the second surface of the first plate about the first hinged joint in the open configuration. The mount may include a levelling plate having a first surface and a second surface, the levelling plate being disposed in the opening of the first plate and coupled to the first plate via a second hinged joint in a manner so as to be pivotable between a flushed configuration and an angled-off configuration, whereby the first surface of the levelling plate may be flushed with the first surface of the first plate in the flushed configuration and the levelling plate may be pivoted away from the first surface of the first plate in the angled-off configuration. The first hinged joint and the second hinged joint may be parallel and may be at opposite portions of the first plate, wherein a free end of the second plate in the closed configuration and a free end of the levelling plate in the flushed configuration may be directed in opposite directions along the first plate. The levelling plate may include a socket structure to receive an attachment assembly for attaching the peripheral device to the first surface of the levelling plate. The first plate may include a lip portion protruding from the second surface of the first plate at an edge portion of the first plate opposite the first hinged joint

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Embodiments described below in the context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to a mount for a peripheral device. According to various embodiments, the peripheral device may include a camera, a microphone, a illumination device, a speaker, a controller, a reader, a projector, a holder or other suitable electronic devices or accessories suitable for use with a computer. According to various embodiments, a camera may be a web camera or any type of camera. According to various embodiments, the mount may be configured for the peripheral device to be removably attached to the mount. According to various embodiments, the mount may include a socket for directly receiving the peripheral device or for receiving an attachment assembly to fix the peripheral device to the mount. According to various embodiments, the mount may be configured so as to be interchangeable between serving as a mount for mounting the peripheral device to a monitor (or a computer display) and serving as a stand for supporting the peripheral device on a surface. According to various embodiments, the mount may include three or more link members coupled to one another via hinged joints in a manner so as to be pivotable relative to one another when interchanging the mount as a monitor-mount or a stand or in a stowage configuration.

Figure 1A:
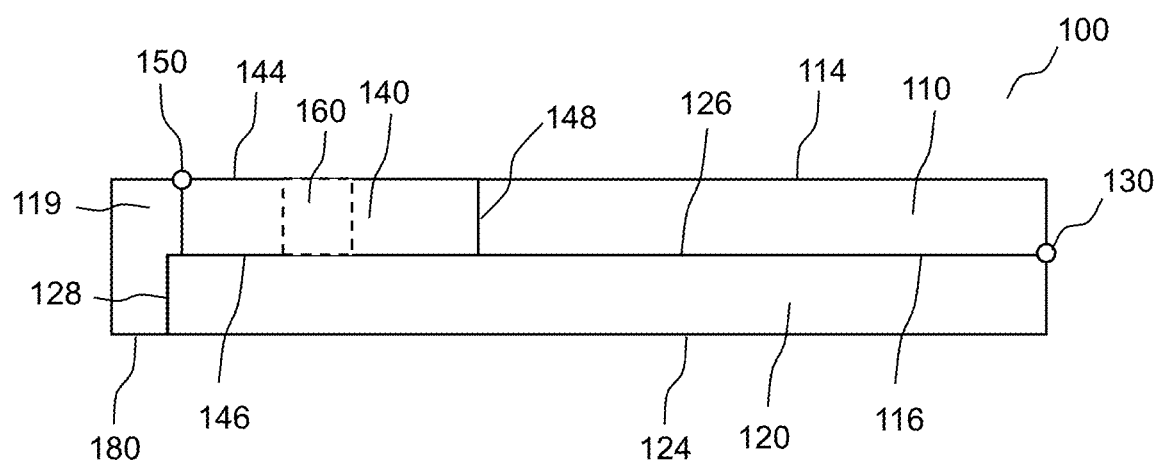
FIG. 1A shows a schematic cross-sectional side view of a mount for a peripheral device in a stowed configuration according to various embodiments.
Figure 1B:
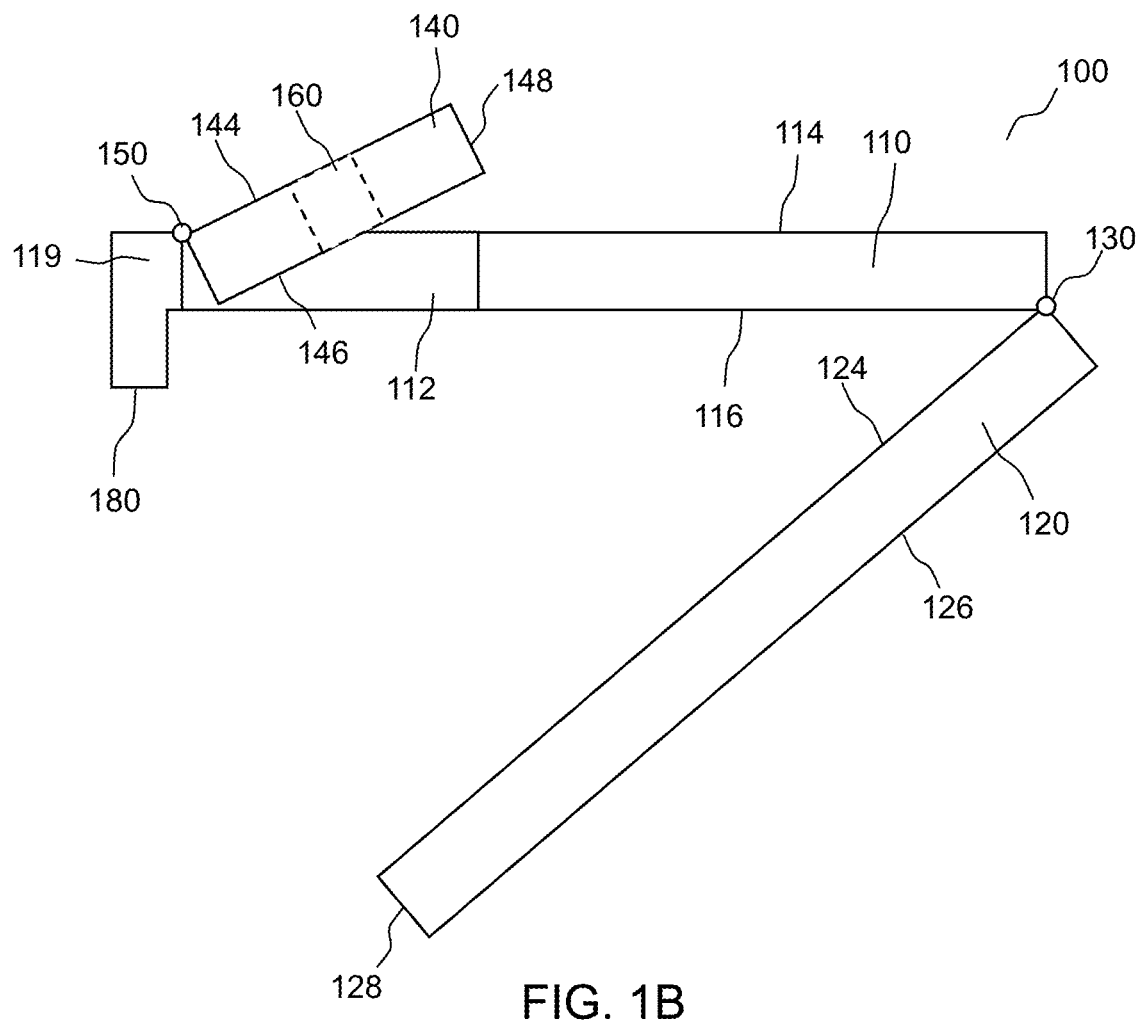
FIG. 1B shows a schematic cross-sectional side view of the mount of FIG. 1A in a deployed configuration according to various embodiments.
Figure 1C:
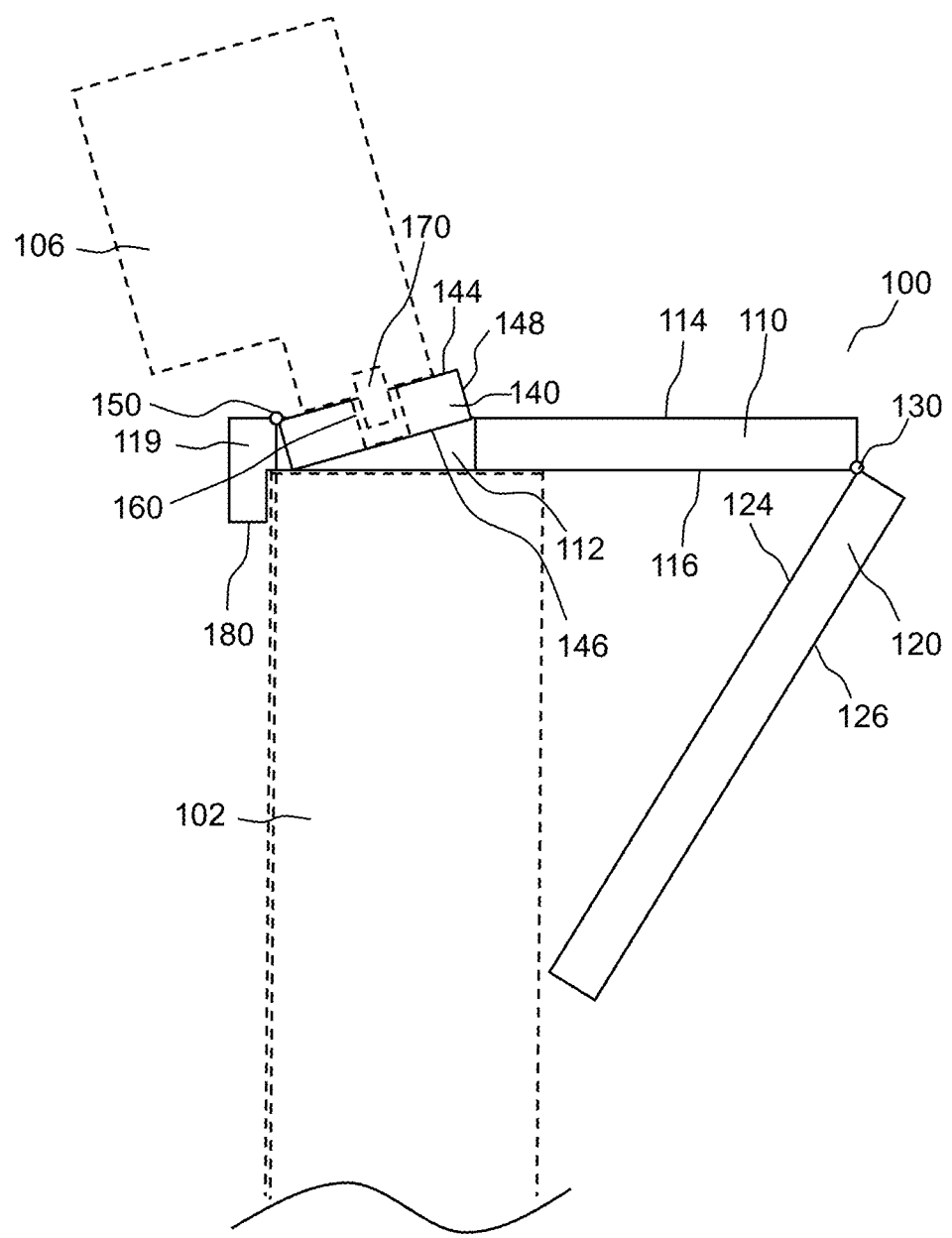
FIG. 1C shows a schematic cross-sectional side view of the mount of FIG. 1A when deployed as a monitor-mount for mounting on a monitor according to various embodiments.
Figure 1D:
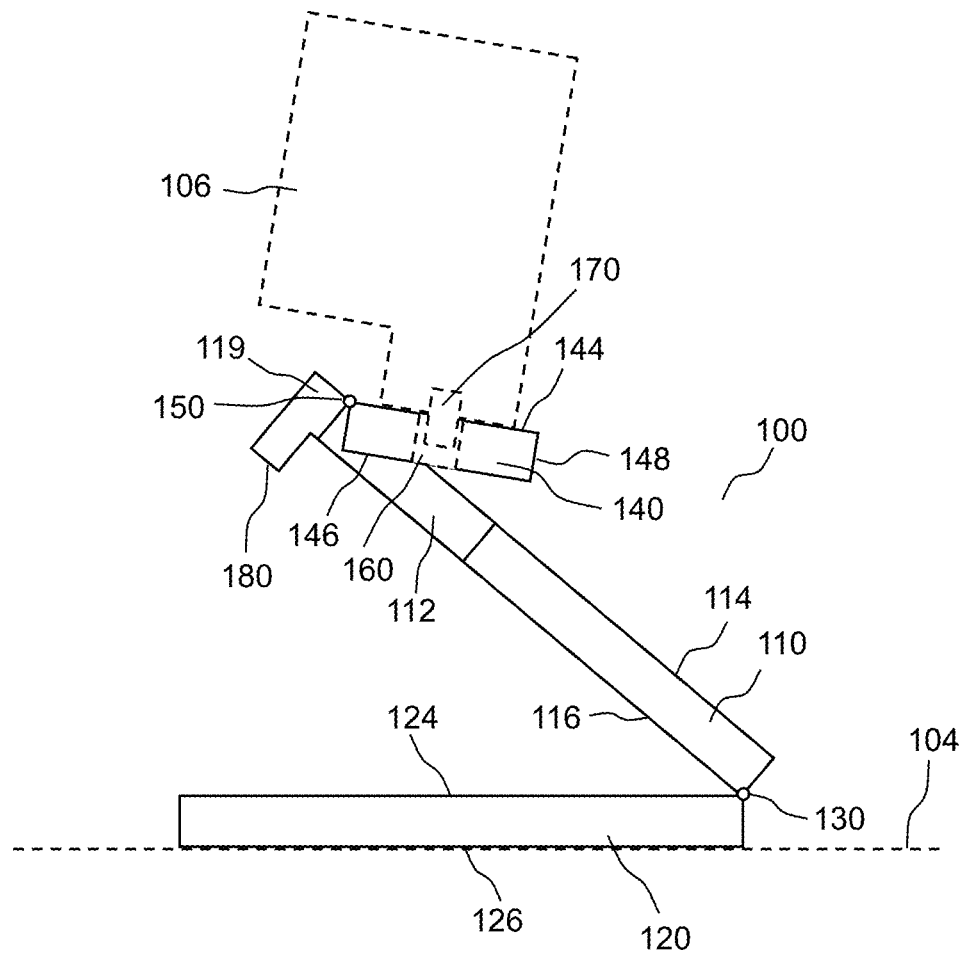
FIG. 1D shows a schematic cross-sectional side view of the mount of FIG. 1A when deployed as a stand for placing on a surface according to various embodiments.

FIG. 1A shows a schematic cross-sectional side view of a mount 100 for a peripheral device in a stowed configuration according to various embodiments. FIG. 1B shows a schematic cross-sectional side view of the mount 100 of FIG. 1A in a deployed configuration according to various embodiments. FIG. 1C shows a schematic cross-sectional side view of the mount 100 of FIG. 1A when deployed as a monitor-mount for mounting on a monitor 102 according to various embodiments. FIG. 1D shows a schematic cross-sectional side view of the mount 100 of FIG. 1A when deployed as a stand for placing on a surface 104 according to various embodiments.

According to various embodiments, the mount 100 may include a first plate 110. According to various embodiments, the first plate 110 may be a thin structure or a thin piece of material or a panel or board or a slab. According to various embodiments, the first plate 110 may include an opening 112. The opening 112 may be a gap or an open space or a through-hole in the first plate 110. According to various embodiments, the opening 112 may go all the way through the first plate 110 from a first surface 114 (or a top surface or an upper surface) of the first plate 110 to a second surface 116 (or a bottom surface or an underneath surface) of the first plate 110. According to various embodiments, the first surface 114 and the second surface 116 of the first plate 110 may be opposite surfaces of the first plate 110. According to various embodiments, the first surface 114 and the second surface 116 of the first plate 110 may be the two opposite broad surfaces of the first plate 110 on two opposite sides across a thickness of the first plate 110.

According to various embodiments, the mount 100 may include a second plate 120. According to various embodiments, the second plate 120 may also be a thin structure or a thin piece of material or a panel or board or a slab. According to various embodiments, the second plate 120 may include a first surface 124 (or a top surface or an upper surface) and a second surface 126 (or a bottom surface or an underneath surface). According to various embodiments, the first surface 124 and the second surface 126 of the second plate 120 may be opposite surfaces of the second plate 120. According to various embodiments, the first surface 124 and the second surface 126 of the second plate 120 may be the two opposite broad surfaces of the second plate 120 on two opposite sides across a thickness of the second plate 120.

According to various embodiments, the second plate 120 may be coupled to the first plate 110 via a first hinged joint 130. Accordingly, the first plate 110 and the second plate 120 may be pivotable with respect to each other between a closed configuration (as shown in FIG. 1A) and an open configuration (as shown in FIG. 1B) in a clam-shell like manner. According to various embodiments, the second plate 120 may be closed onto the second surface 116 of the first plate 110 in the closed configuration. Accordingly, in the closed configuration, the first surface 124 of the second plate 120 may be closed onto the second surface 116 of the first plate 110 such that the first surface 124 of the second plate 120 may be in contact or touching the second surface 116 of the first plate 110. According to various embodiments, the second plate 120 may be pivoted away from the second surface 116 of the first plate 110 about the first hinged joint 130 in the open configuration. Accordingly, in the open configuration, the first plate 110 and the second plate 120 may be angularly positioned relative to each other about the first hinged joint 130 such that the first surface 124 of the second plate 120 and the second surface 116 of the first plate 110 may form an angle therebetween. Hence, in the open configuration, the second plate 120 may be pivoted from the first plate 110 such that the first surface 124 of the second plate 120 may be directed towards or opposing the second surface 116 of the first plate 110.

According to various embodiments, the mount 100 may include a levelling plate 140. According to various embodiments, the levelling plate 140 may also be a thin structure or a thin piece of material or a panel or board or a slab. According to various embodiments, the levelling plate 140 may include a first surface 144 (or a top surface or an upper surface) and a second surface 146 (or a bottom surface or an underneath surface). According to various embodiments, the first surface 144 and the second surface 146 of the levelling plate 140 may be opposite surfaces of the levelling plate 140. According to various embodiments, the first surface 144 and the second surface 146 of the levelling plate 140 may be the two opposite broad surfaces of the levelling plate 140 on two opposite sides across a thickness of the levelling plate 140.

According to various embodiments, the levelling plate 140 may be disposed in the opening 112 of the first plate 110. Accordingly, the levelling plate 140 may be equal or smaller in size than the opening 112 of the first plate 110 so as to be placed within the opening 112 of the first plate 110. Hence, the levelling plate 140 may be fitted or inserted inside the opening 112 of the first plate 110 such that an inner wall surface 113 of the opening 112 of the first plate 110 may surround the levelling plate 140. According to various embodiments, the levelling plate 140 may have a shape corresponding to a shape of the opening 112 of the first plate 110. Accordingly, the shape of the first surface 144 and the second surface 146 of the levelling plate 140 may correspond to a cross-sectional shape of the opening 112 of the first plate 110.

According to various embodiments, the levelling plate 140 may be coupled to the first plate 110 via a second hinged joint 150. Accordingly, the levelling plate 140 and the first plate 110 may be pivotable with respect to each other between a flushed configuration (as shown in FIG. 1A) and an angled-off configuration (as shown in FIG. 1B). According to various embodiments, the first surface 144 of the levelling plate 140 may be flushed with the first surface 114 of the first plate 110 in the flushed configuration. Accordingly, in the flushed configuration, the levelling plate 140 may be aligned to the first plate 110 and fitted fully within the opening 112 of the first plate 110 in a manner such that the first surface 144 of the levelling plate 140 and the first surface 114 of the first plate 110 may create an almost completely (or substantially) continuous plane across the levelling plate 140 and the first plate 110. Hence, in the flushed configuration, the first surface 144 and the second surface 146 of the levelling plate 140 may be parallel to the first surface 114 and the second surface 116 of the first plate 110. According to various embodiments, the levelling plate 140 may be pivoted away from the first surface 114 of the first plate 110 in the angled-off configuration. Accordingly, in the angled-off configuration, the first plate 110 and the levelling plate 140 may be angularly positioned relative to each other about the second hinged joint 150 such that the first surface 114 of the first plate 110 and the second surface 146 of the levelling plate 140 may form an angle therebetween. Hence, in the angled-off configuration, the levelling plate 140 may be pivoted from the first plate 110 such that the second surface 146 of the levelling plate 140 may be directed towards or opposing the first surface 114 of the first plate 110.

According to various embodiments, the first hinged joint 130 and the second hinged joint 150 may be parallel to each other. Accordingly, a pivot axis of the first hinged joint 130 and a pivot axis of the second hinged joint 150 may be parallel to each other. According to various embodiments, the first hinged joint 130 and the second hinged joint 150 may be at opposite portions of the first plate 110. Accordingly, the first hinged joint 130 and the second hinged joint 150 may be disposed laterally apart from each other along the first plate 110 such that the pivot axis of the first hinged joint 130 and the pivot axis of the second hinged joint may be parallel to each other. Hence, when the first hinged joint 130 is located on one side of a midpoint along the first plate 110, the second hinged joint 150 may be located on an opposite side of the midpoint along the first plate 110. According to various embodiments, the first plate 110 may be of an elongated shape. For example, the elongated shape may include, but not limited to, rectangular shape, oval shape, elliptical shape, oblong shape, rounded rectangular shape, or racetrack shape. According to various embodiments, the first hinged joint 130 and the second hinged joint 150 may be at two opposite longitudinal end portions of the first plate 110.

According to various embodiments, as shown in FIG. 1A, a free end 128 of the second plate 120 in the closed configuration and a free end 148 of the levelling plate 140 in the flushed configuration may be directed in opposite directions along the first plate 110. Accordingly, when the second plate 120 is in the closed configuration, the free end 128 of the second plate 120 may be pointing in a first direction along the first plate 110 from the first hinged joint 130 towards the second hinged joint 150. Further, when the levelling plate 140 is in the flushed configuration, the free end 148 of the levelling plate 140 may be pointing in a second direction along the first plate 110 from the second hinged joint 150 towards the first hinged joint 130. According to various embodiments, the first direction and the second direction may be opposite directions along the first plate 110.

According to various embodiments, with the first hinged joint 130 and the second hinged joint 150 being parallel and at opposite portions of the first plate 110 as well as with the free end 128 of the second plate 120 in the closed configuration and the free end 148 of the levelling plate 140 in the flushed configuration directed in opposite directions along the first plate 110, the mount 100 may formed a zig-zag configuration when the second plate 120 is pivoted to the opened configuration and the levelling plate 140 is pivoted to the angled-off configuration. Accordingly, pivoting the second plate 120 away from the first plate 110 and pivoting the levelling plate 140 away from the first plate 110 may form a zig-zag arrangement with the first plate 110, the second plate 120 and the levelling plate 140.

According to various embodiments, the levelling plate 140 may include a socket structure 160. According to various embodiments, the socket structure 160 may be a hollow structure or a hollow part. According to various embodiments, the socket structure 160 may be configured to receive an attachment assembly 170 (see FIG. 1C) for attaching the peripheral device (for example, see camera 106 in FIG. 1C) to the first surface 144 of the levelling plate 140. Accordingly, the socket structure 160 may be configured to receive and hold the attachment assembly 170 in a manner so as to attach the peripheral device (e.g. the camera 106) to the first surface 144 of the levelling plate 140. According to various embodiments, the attachment assembly 170 may serve to attach the peripheral device (e.g. the camera 106) to the levelling plate 140. Accordingly, the attachment assembly 170 may be fitted into the socket structure 160 so as to be received and held by the socket structure 160 of the levelling plate 140 and may also be attached to the peripheral device (e.g. the camera 106) such that the peripheral device is attached to the levelling plate 140 via the attachment assembly 170.

According to various embodiments, the first plate 110 may include a lip portion 180. According to various embodiments, the lip portion 180 may be protruding from the second surface 116 of the first plate 110 at an edge portion 119 of the first plate 110 opposite the first hinged joint 130. According to various embodiments, the lip portion 180 may be a ridge or a ledge or a raised edge protruding from the second surface 116 of the first plate 110. According to various embodiments, a height direction of the lip portion 180 may be protruding perpendicularly from the second surface 116 of the first plate 110. According to various embodiments, the edge portion 119 of the first plate 110 may also be the portion of the first plate 110 which the second hinged joint 150 may be located. Accordingly, the levelling plate 140 may be coupled to the edge portion 119 of the first plate 110 via the second hinged joint 150. According to various embodiments, when the first plate 110 is of an elongated shape, the lip portion 180 may be protruding from the second surface 116 of the first plate 110 at the longitudinal end portion of the first plate 110 opposite the first hinged joint 130. Further, the levelling plate 140 may be coupled to the same longitudinal end portion of the first plate 110 opposite the first hinged joint 130.

According to various embodiments, a distance between the first hinged joint 130 and the lip portion 180 of the first plate 110 may be equal or greater than a distance between the first hinged joint 130 and the free end 128 of the second plate 120. According to various embodiments, when the first plate 110 and the second plate 120 are in the closed configuration, the second plate 120 may fully close onto the first plate 110 as the lip portion 180 of the first plate 110 may not obstruct or block the second plate 120. According to various embodiments, in the closed configuration, the first surface 124 of the second plate 120 may be flat against the second surface 116 of the first plate 110. Accordingly, in the closed configuration, the first surface 124 of the second plate 120 may be fully in contact or fully touching the second surface 116 of the first plate 110.

According to various embodiments, the first hinged joint 130 may be configured to hold its angle or position in a manner so as to hold the second plate 120 at various desired angles with respect to the first plate 110. According to various embodiments, the second hinged joint 150 may be configured to hold its angle or position in a manner so as to hold the levelling plate 140 at various desired angles with respect to the first plate 110. According to various embodiments, each of the first hinged joint 130 and the second hinged joint 150 may be configured to provide resistance to respective pivoting motion such that the resistance arrests the pivoting motion to the extent that the first hinged joint 130 and the second hinged joint 150 respectively is held in a corresponding position on its own when no external forces is applied to pivot the first hinged joint 130 and the second hinged joint 150 respectively. According to various embodiments, each of the first hinged joint 130 and the second hinged joint 150 may include, but not limited to, a torque hinge, a friction hinge, a free-stop hinge or a ratchet hinge.

FIG. 1C shows the mount 100 being deployed as the monitor-mount for mounting the camera 106, as an example of the peripheral device, on the monitor 102 according to various embodiments. As shown, in use, the first plate 110 of the mount 100 may be placed over a top of the monitor 102 in a manner such that the lip portion 180 of the first plate 110 may be in front of the monitor 102 so as to be abutting the front of the monitor 102 and the second plate 120 of the mount may be behind the monitor 102 with the free-end 128 of the second plate 120 abutting the back of the monitor 102. When placed in this manner on the monitor 102, the mount 100 may be stable and may not fall off the monitor 102. Further, since the camera 106 is attached to the levelling plate 140 of the mount 100, the camera 106 may be tilted to adjust the camera angle by pivoting the levelling plate 140 with respect to the first plate 110. Accordingly, with the levelling plate 140, the mount 100 may enable tilting of the camera 106 without requiring adjustment to be made to the first plate 110 and the second plate 120 which are stably placed on the monitor 102.

FIG. 1D shows the mount 100 being deployed as the stand for placing the camera 106, as an example of the peripheral device, on the surface 104 according to various embodiments. As shown, in use, the second plate 120 may serve as a base of the stand whereby the second surface 126 of the second plate 120 may be placed flat on the surface 104. With the second plate 120 placed flat on the surface 104, the first plate 110 may serve to elevate the camera 106 to a desired height off the surface 104. Further, after the camera 106 is set at the desired height by pivoting the first plate 110 with respect to the second plate 120, the camera 106 may be further tilted to adjust the camera angle by pivoting the levelling plate 140 with respect to the first plate 110. According to various embodiments, as shown in FIG. 1C and FIG. 1D, the mount 100 may be easily interchange between the monitor mount and the stand.

Figure 2A:
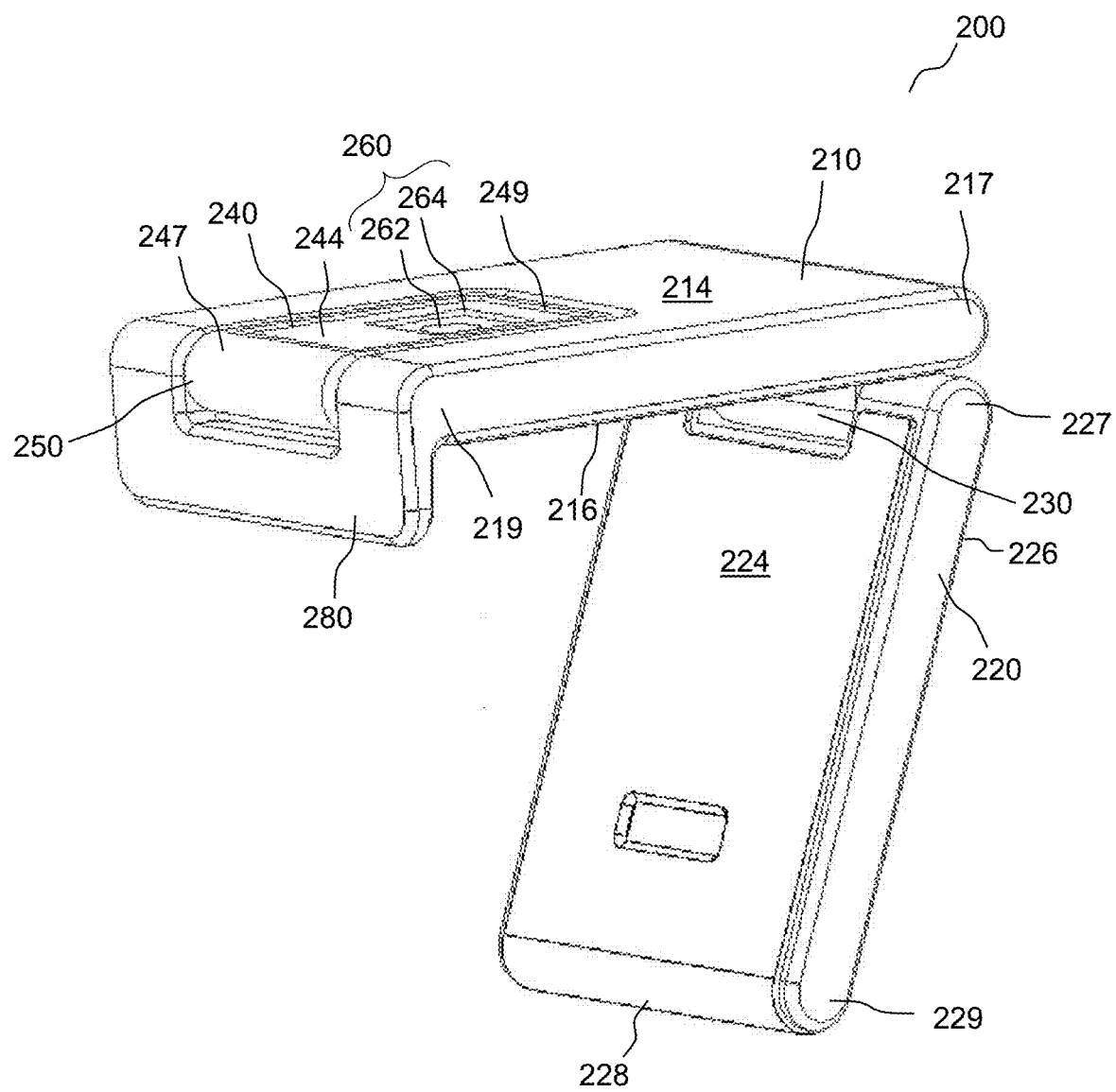
FIG. 2A shows a mount for a peripheral device according to various embodiments.
Figure 2B:
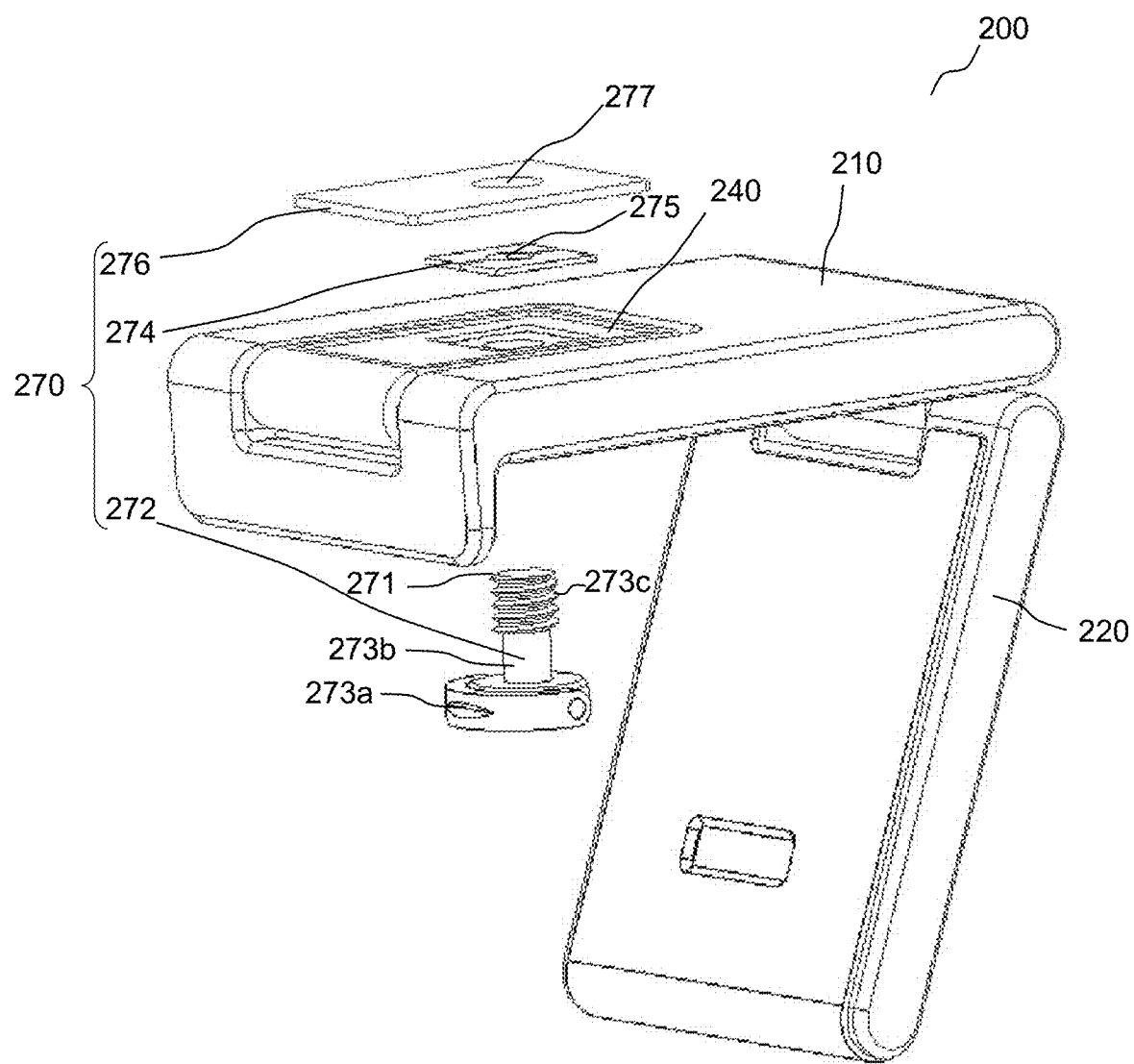
FIG. 2B shows the mount of FIG. 2A having an attachment assembly in an unassembled state according to various embodiments.
Figure 2C:
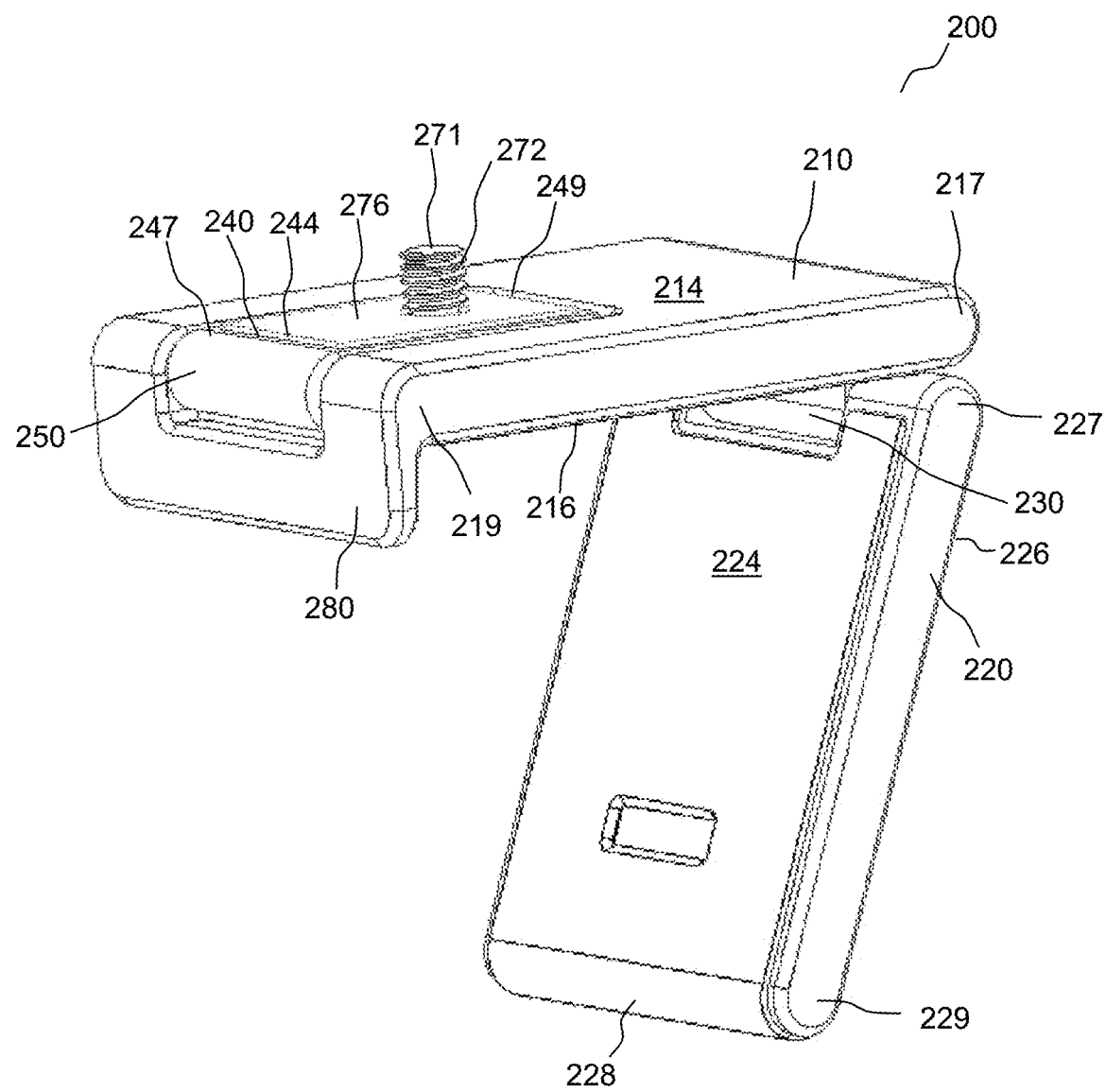
FIG. 2C shows the mount of FIG. 2A having the attachment assembly in the assembled state according to various embodiments.
Figure 2E:
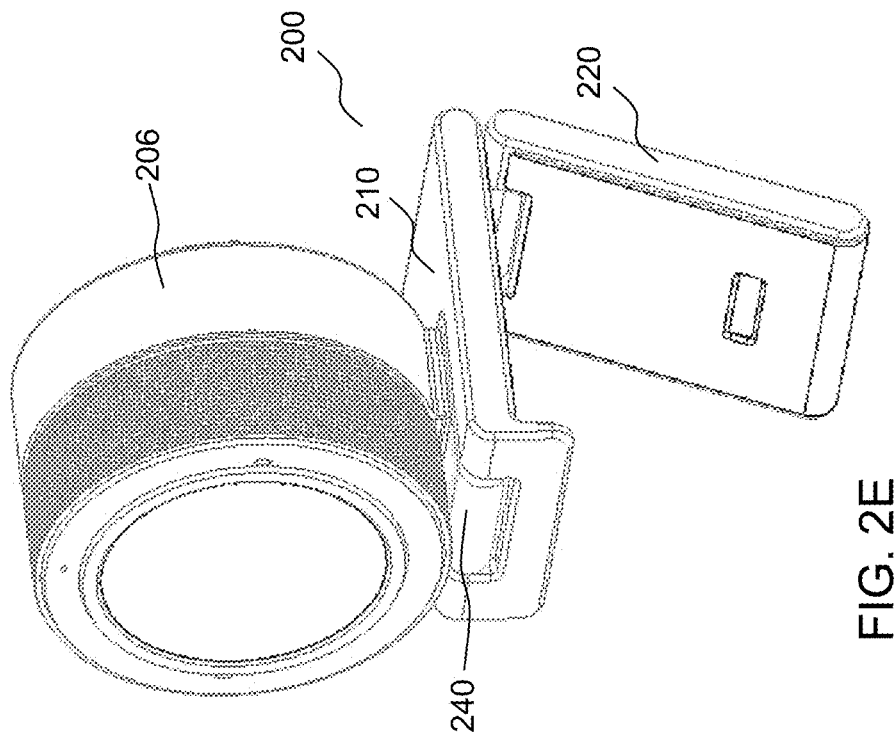
FIG. 2E shows the mount of FIG. 2A having the attachment assembly with the camera attached to the mount according to various embodiments.
Figure 2D:
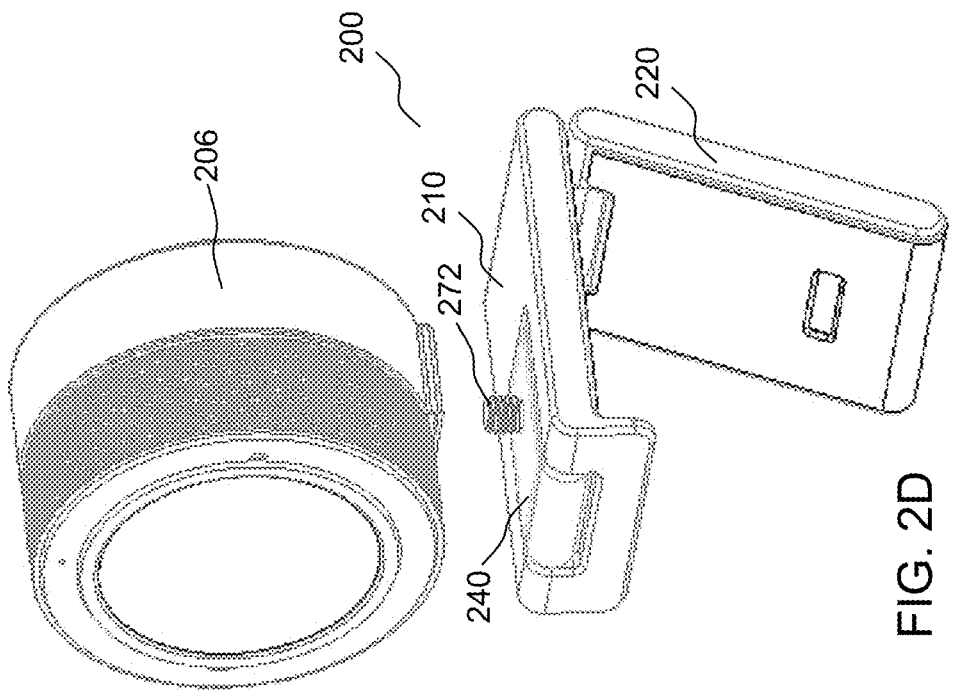
FIG. 2D shows the mount of FIG. 2A having the attachment assembly and a camera prior to being attached to the mount according to various embodiments.
Figure 2F:
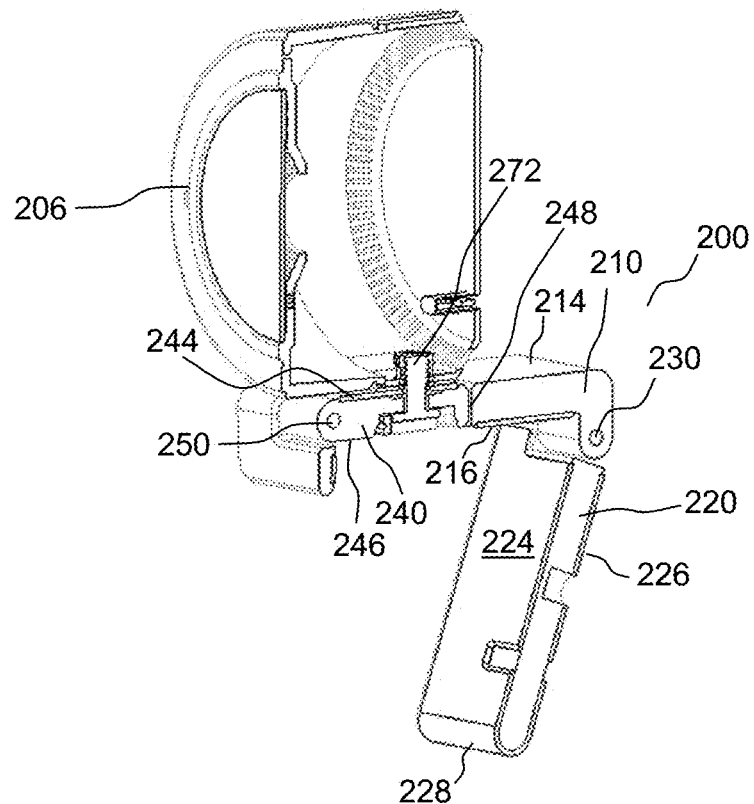
FIG. 2F shows a cross-sectional side view of FIG. 2E according to various embodiments.
Figure 2G:
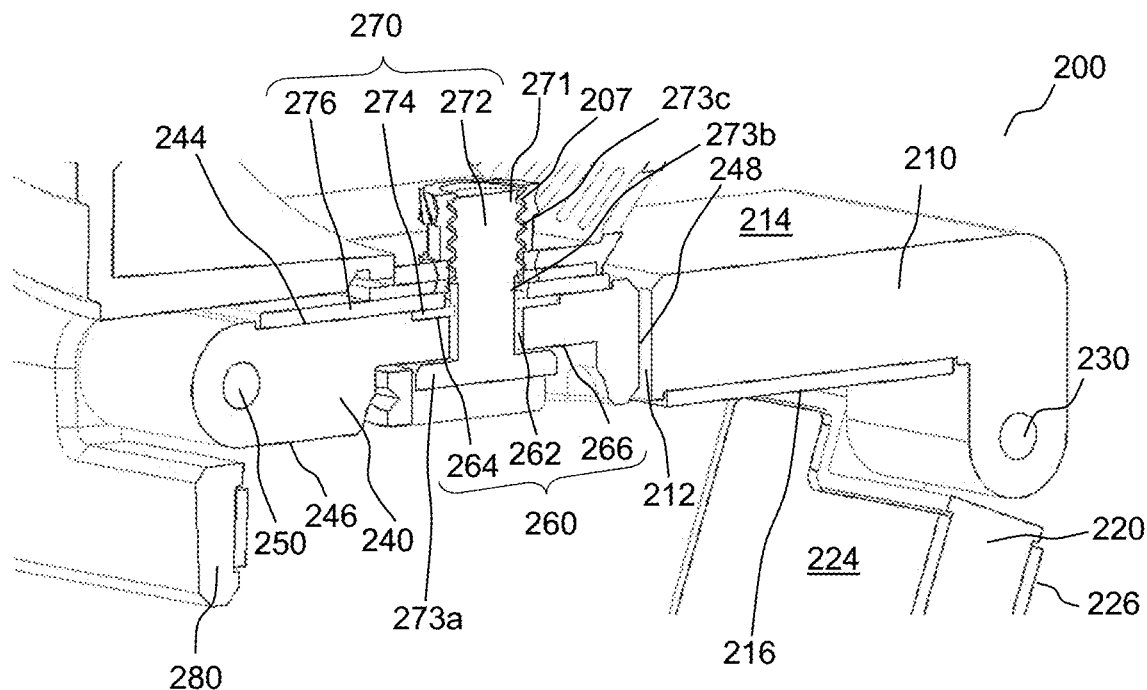
FIG. 2G shows an enlarged view of FIG. 2F zoomed in to the connection between the camera and the mount according to various embodiments.
Figure 2H:
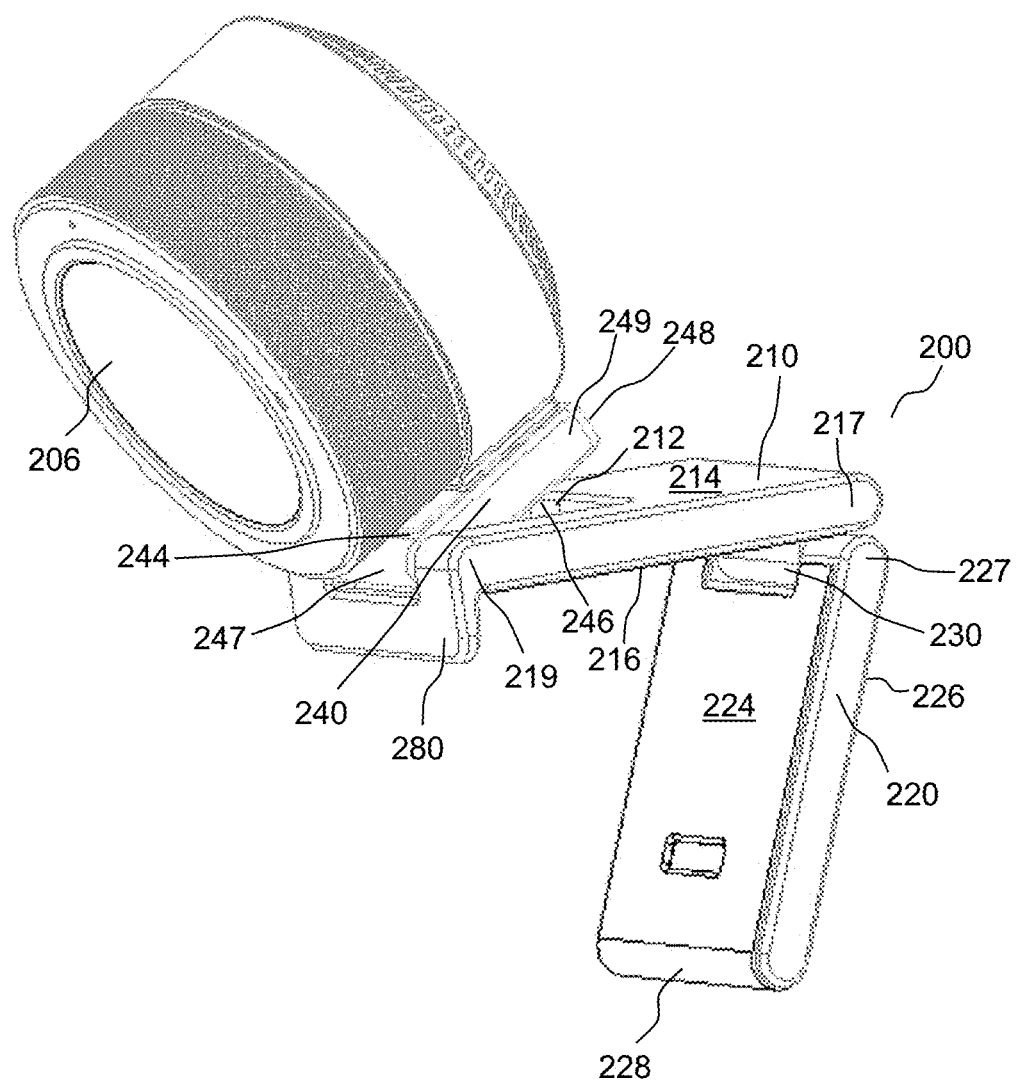
FIG. 2H shows the mount of FIG. 2A with the camera tilted with respect to the mount according to various embodiments.

FIG. 2A shows a mount 200 for a peripheral device according to various embodiments. FIG. 2B shows the mount 200 having an attachment assembly 270 in an unassembled state according to various embodiments. FIG. 2C shows the mount 200 having the attachment assembly 270 in the assembled state according to various embodiments. FIG. 2D shows the mount 200 having the attachment assembly 270 and a camera 206 (as an example of the peripheral device) prior to being attached to the mount 200 according to various embodiments. FIG. 2E shows the mount 200 having the attachment assembly 270 with the camera 206 (as an example of the peripheral device) attached to the mount 200 according to various embodiments. FIG. 2F shows a cross-sectional side view of FIG. 2E according to various embodiments. FIG. 2G shows an enlarged view of FIG. 2F zoomed in to the connection between the camera 206 (as an example of the peripheral device) and the mount 200 according to various embodiments. FIG. 2H shows the mount 200 with the camera 206 (as an example of the peripheral device) tilted with respect to the mount 200 according to various embodiments.

According to various embodiments, the mount 200 may include a first plate 210. According to various embodiments, the first plate 210 may be a thin structure or a thin piece of material or a panel or board or a slab. According to various embodiments, the first plate 210 may include an opening 212. The opening 212 may be a gap or an open space or a through-hole in the first plate 210. According to various embodiments, the opening 212 may go all the way through the first plate 210 from a first surface 214 (or a top surface or an upper surface) of the first plate 210 to a second surface 216 (or a bottom surface or an underneath surface) of the first plate 210. According to various embodiments, the first surface 214 and the second surface 216 of the first plate 210 may be opposite surfaces of the first plate 210. According to various embodiments, the first surface 214 and the second surface 216 of the first plate 210 may be the two opposite broad surfaces of the first plate 210 on two opposite sides across a thickness of the first plate 210. According to various embodiments, the first plate 210 may be of an elongated shape. As shown, the first plate 210 may be of a rectangular shape. It is understood that the elongated shape of the first plate 210 may include, but not limited to, oval shape, elliptical shape, oblong shape, rounded rectangular shape, or racetrack shape.

According to various embodiments, the mount 200 may include a second plate 220. According to various embodiments, the second plate 220 may also be a thin structure or a thin piece of material or a panel or board or a slab. According to various embodiments, the second plate 220 may include a first surface 224 (or a top surface or an upper surface) and a second surface 226 (or a bottom surface or an underneath surface). According to various embodiments, the first surface 224 and the second surface 226 of the second plate 220 may be opposite surfaces of the second plate 220. According to various embodiments, the first surface 224 and the second surface 226 of the second plate 220 may be the two opposite broad surfaces of the second plate 220 on two opposite sides across a thickness of the second plate 220. According to various embodiments, the second plate 220 may be of an elongated shape. As shown, the second plate 220 may be of a rectangular shape. It is understood that the elongated shape of the second plate 220 may include, but not limited to, oval shape, elliptical shape, oblong shape, rounded rectangular shape, or racetrack shape.

According to various embodiments, the second plate 220 may be coupled to the first plate 210 via a first hinged joint 230. According to various embodiments, a first edge portion 227 of the second plate 220 may be coupled to a first edge portion 217 of the first plate 210 via the first hinged joint 230. Accordingly, the first plate 210 and the second plate 220 may be pivotable with respect to each other between a closed configuration and an open configuration in a clam-shell like manner. According to various embodiments, the second plate 220 may be closed onto the second surface 216 of the first plate 210 in the closed configuration. Accordingly, in the closed configuration, the first surface 224 of the second plate 220 may be closed onto the second surface 216 of the first plate 210 such that the first surface 224 of the second plate 220 may be in contact or touching the second surface 216 of the first plate 210. According to various embodiments, the second plate 220 may be pivoted away from the second surface 216 of the first plate 210 about the first hinged joint 230 in the open configuration. Accordingly, in the open configuration, the first plate 210 and the second plate 220 may be angularly positioned relative to each other about the first hinged joint 230 such that the first surface 224 of the second plate 220 and the second surface 216 of the first plate 210 may form an angle therebetween. Hence, in the open configuration, the second plate 220 may be pivoted from the first plate 210 such that the first surface 224 of the second plate 220 may be directed towards or opposing the second surface 216 of the first plate 210. According to various embodiments, the first hinged joint 230 may be formed by interlocking the first edge portion 227 of the second plate 220 and the first edge portion 217 of the first plate 210 with a pin passing through respective knuckle(s) at each of the first edge portion 227 of the second plate 220 and the first edge portion 217 of the first plate 210.

According to various embodiments, the mount 200 may include a levelling plate 240. According to various embodiments, the levelling plate 240 may also be a thin structure or a thin piece of material or a panel or board or a slab. According to various embodiments, the levelling plate 240 may include a first surface 244 (or a top surface or an upper surface) and a second surface 246 (or a bottom surface or an underneath surface). According to various embodiments, the first surface 244 and the second surface 246 of the levelling plate 240 may be opposite surfaces of the levelling plate 240. According to various embodiments, the first surface 244 and the second surface 246 of the levelling plate 240 may be the two opposite broad surfaces of the levelling plate 240 on two opposite sides across a thickness of the levelling plate 240.

According to various embodiments, the levelling plate 240 may be disposed in the opening 212 of the first plate 210. Accordingly, the levelling plate 240 may be equal or smaller in size than the opening 212 of the first plate 210 so as to be placed within the opening 212 of the first plate 210. Hence, the levelling plate 240 may be fitted or inserted inside the opening 212 of the first plate 210 such that an inner wall surface 213 of the opening 212 of the first plate 210 may surround the levelling plate 240. According to various embodiments, the levelling plate 240 may have a shape corresponding to a shape of the opening 212 of the first plate 210. Accordingly, the shape of the first surface 244 and the second surface 246 of the levelling plate 240 may correspond to a cross-sectional shape of the opening 212 of the first plate 210. According to various embodiments, the opening 212 of the first plate 210 may be located towards a second edge portion 219 of the first plate 210 such that the opening 212 of the first plate 210 having the elongated cross-sectional profile may stretch from the second edge portion 219 of the first plate 210 inwards along the first plate 210.

According to various embodiments, a cross-sectional profile of the opening 212 of the first plate 210 may have an elongated shape. According to various embodiments, as shown, the cross-sectional profile of the opening 212 of the first plate 210 may have a rectangular shape. It is understood that the cross-sectional profile of the opening 212 of the first plate 210 may include, but not limited to, oval shape, elliptical shape, oblong shape, rounded rectangular shape, or racetrack shape. According to various embodiments, the levelling plate 240 may be of a corresponding elongated shape. According to various embodiments, as shown, the levelling plate 240 may be of a corresponding rectangular shape.

According to various embodiments, the levelling plate 240 may be coupled to the first plate 210 via a second hinged joint 250. According to various embodiments, a first edge portion 247 of the levelling plate 240 may be coupled to the second edge portion 219 of the first plate 210. Accordingly, the levelling plate 240 and the first plate 210 may be pivotable with respect to each other between a flushed configuration (as shown in FIG. 2A) and an angled-off configuration (as shown in FIG. 2H). According to various embodiments, the first surface 244 of the levelling plate 240 may be flushed with the first surface 214 of the first plate 210 in the flushed configuration. Accordingly, in the flushed configuration, the levelling plate 240 may be aligned to the first plate 210 and fitted fully within the opening 212 of the first plate 240 in a manner such that the first surface 244 of the levelling plate 240 and the first surface 214 of the first plate 240 may create an almost completely (or substantially) continuous plane across the levelling plate 240 and the first plate 210. Hence, in the flushed configuration, the first surface 244 and the second surface 246 of the levelling plate 240 may be parallel to the first surface 214 and the second surface 216 of the first plate 210. According to various embodiments, the levelling plate 240 may be pivoted away from the first surface 214 of the first plate 210 in the angled-off configuration. Accordingly, in the angled-off configuration, the first plate 210 and the levelling plate 240 may be angularly positioned relative to each other about the second hinged joint 250 such that the first surface 214 of the first plate 210 and the second surface 246 of the levelling plate 240 may form an angle therebetween. Hence, in the angled-off configuration, the levelling plate 240 may be pivoted from the first plate 210 such that the second surface 246 of the levelling plate 240 may be directed towards or opposing the first surface 214 of the first plate 210. According to various embodiments, the second hinged joint may be formed by interlocking the first edge portion 247 of the levelling plate 240 and the second edge portion 219 of the first plate 210 with a pin passing through respective knuckle at each of the first edge portion 247 of the levelling plate 240 and the second edge portion 219 of the first plate 210.

According to various embodiments, the first hinged joint 230 and the second hinged joint 250 may be parallel to each other. Accordingly, a pivot axis of the first hinged joint 230 and a pivot axis of the second hinged joint 250 may be parallel to each other. According to various embodiments, the first hinged joint 230 and the second hinged joint 250 may be at opposite portions of the first plate 210. For example, the first hinged joint 230 may be at the first edge portion 217 of the first plate 210 and the second hinged joint 250 may be at the second edge portion 219 of the first plate 210. The first edge portion 217 and the second edge portion 219 of the first plate 210 may be opposite edge portions. Accordingly, the first hinged joint 230 and the second hinged joint 250 may be disposed laterally apart from each other along the first plate 210 such that the pivot axis of the first hinged joint 230 and the pivot axis of the second hinged joint may be parallel to each other. Hence, when the first hinged joint 230 is located on one side of a midpoint along the first plate 210 (for example, the first edge portion 217 of the first plate 210), the second hinged joint 250 may be located on an opposite side of the midpoint along the first plate 210 (for example, the second edge portion 219 of the first plate 210). According to various embodiments, when the first plate 210 is of an elongated shape, the first hinged joint 230 and the second hinged joint 250 may be at two opposite longitudinal end portions of the first plate 210. Accordingly, the first edge portion 217 of the first plate 210 at which the first hinged joint 230 is located may be a first longitudinal end portion of the elongated shaped first plate 210, and the second edge portion 219 of the first plate 210 at which the second hinged joint 250 is located may be a second longitudinal end portion of the elongated shaped first plate 210.

According to various embodiments, a free end 228 of the second plate 220 in the closed configuration and a free end 248 of the levelling plate 240 in the flushed configuration may be directed in opposite directions along the first plate 210. Accordingly, when the second plate 220 is in the closed configuration, the free end 228 of the second plate 220 may be pointing in a first direction along the first plate 210 from the first hinged joint 230 towards the second hinged joint 250. Further, when the levelling plate 240 is in the flushed configuration, the free end 248 of the levelling plate 240 may be pointing in a second direction along the first plate 210 from the second hinged joint 250 towards the first hinged joint 230. According to various embodiments, the first direction and the second direction may be opposite directions along the first plate 210. According to various embodiments, the free end 228 of the second plate 220 may be at the second edge portion 229 of the second plate 220. According to various embodiments, the free end 248 of the levelling plate 240 may be at the second edge portion 249 of the levelling plate 240.

According to various embodiments, with the first hinged joint 230 and the second hinged joint 250 being parallel and at opposite portions of the first plate 210 as well as with the free end 228 of the second plate 220 in the closed configuration and the free end 248 of the levelling plate 240 in the flushed configuration directed in opposite directions along the first plate 210, the mount 200 may formed a zig-zag configuration when the second plate 220 is pivoted to the opened configuration and the levelling plate 240 is pivoted to the angled-off configuration. Accordingly, pivoting the second plate 220 away from the first plate 210 and pivoting the levelling plate 240 away from the first plate 210 may form a zig-zag arrangement with the first plate 210, the second plate 220 and the levelling plate 240.

According to various embodiments, the first plate 210 may include a lip portion 280. According to various embodiments, the lip portion 280 may be protruding from the second surface 216 of the first plate 210 at the second edge portion 219 of the first plate 210 opposite the first hinged joint 230 (or opposite the first edge portion 217). According to various embodiments, the lip portion 280 may be a ridge or a ledge or a raised edge protruding from the second surface 216 of the first plate 210. According to various embodiments, a height direction of the lip portion 280 may be protruding perpendicularly from the second surface 216 of the first plate 210. According to various embodiments, the second edge portion 219 of the first plate 210 may also be the portion of the first plate 210 which the second hinged joint 250 may be located. Accordingly, the levelling plate 240 may be coupled to the second edge portion 219 of the first plate 210 via the second hinged joint 250. According to various embodiments, when the first plate 210 is of an elongated shape, the lip portion 280 may be protruding from the second surface 216 of the first plate 210 at the second longitudinal end portion, which is also the second edge portion 219, of the first plate 210 opposite the first hinged joint 230. Further, the levelling plate 240 may be coupled to the same longitudinal end portion of the first plate 210 opposite the first hinged joint 230.

According to various embodiments, a distance between the first hinged joint 230 and the lip portion 280 of the first plate 210 may be equal or greater than a distance between the first hinged joint 230 and the free end 228 of the second plate 220. According to various embodiments, when the first plate 210 and the second plate 220 are in the closed configuration, the second plate 220 may fully close onto the first plate 210 as the lip portion 280 of the first plate 210 may not obstruct or block the second plate 220. According to various embodiments, in the closed configuration, the first surface 224 of the second plate 220 may be flat against the second surface 216 of the first plate 210. Accordingly, in the closed configuration, the first surface 224 of the second plate 220 may be fully in contact or fully touching the second surface 216 of the first plate 210.

According to various embodiments, the first hinged joint 230 may be configured to hold its angle or position in a manner so as to hold the second plate 220 at various desired angles with respect to the first plate 210. According to various embodiments, the second hinged joint 250 may be configured to hold its angle or position in a manner so as to hold the levelling plate 240 at various desired angles with respect to the first plate 210. According to various embodiments, each of the first hinged joint 230 and the second hinged joint 250 may be configured to provide resistance to respective pivoting motion such that the resistance arrests the pivoting motion to the extent that the first hinged joint 230 and the second hinged joint 250 respectively is held in a corresponding position on its own when no external forces is applied to pivot the first hinged joint 230 and the second hinged joint 250 respectively. According to various embodiments, each of the first hinged joint 230 and the second hinged joint 250 may include, but not limited to, a torque hinge, a friction hinge, a free-stop hinge or a ratchet hinge.

According to various embodiments, the levelling plate 240 may include a socket structure 260. According to various embodiments, the socket structure 260 may be a hollow structure or a hollow part. According to various embodiments, the socket structure 260 may be configured to receive an attachment assembly 270 (see FIG. 2B) for attaching the peripheral device (see camera 206 in FIG. 2D) to the first surface 244 of the levelling plate 240. Accordingly, the socket structure 260 may be configured to receive and hold the attachment assembly 270 in a manner so as to attach the peripheral device (e.g. the camera 206) to the first surface 244 of the levelling plate 240. According to various embodiments, the attachment assembly 270 may serve to attach the peripheral device (e.g. the camera 206) to the levelling plate 240. Accordingly, the attachment assembly 270 may be fitted into the socket structure 260 so as to be received and held by the socket structure 260 of the levelling plate 240 and may also be attached to the peripheral device (e.g. the camera 206) such that the peripheral device is attached to the levelling plate 240 via the attachment assembly 270.

According to various embodiments, the socket structure 260 may include a through-hole 262 extending from the first surface 244 of the levelling plate 240 to the second surface 246 of the levelling plate 240. Accordingly, the through-hole 262 may go all the way through or completely through the levelling plate 240 in a thickness direction of the levelling plate 240. According to various embodiments, the through-hole 262 may have a circular cross-sectional profile. According to various embodiments, the through-hole 262 of the socket structure 260 may receive the attachment assembly 270 for attaching the peripheral device (e.g. the camera 206) to the levelling plate 240. According to various embodiments, the socket structure 260 may further include a first recess 264 in the first surface 244 of the levelling plate 240 and surrounding an aperture of the through-hole 262 at the first surface 244 of the levelling plate 240. According to various embodiments, the socket structure 260 may include a sunken portion 266 of the second surface 246 of the levelling plate 240. The sunken portion 266 of the second surface 246 of the levelling plate 240 may surround an aperture of the through-hole 262 at the second surface 246 of the levelling plate 240.

According to various embodiments, the mount 200 may include the attachment assembly 270 fitted to the socket structure 260 of the levelling plate 240. According to various embodiments, the attachment assembly 270 may include a screw 272 inserted through the through-hole 262 from the second surface 246 of the levelling plate 240 to the first surface 244 of the levelling plate 240 such that a screw head 273a of the screw 272 may be abutting the second surface 246 of the levelling plate 240. Accordingly, the screw 272 may be pushed or poked or stick through the through-hole 262 in the levelling plate 240 such that the screw head 273a of screw 272 abuts the second surface 246 of the levelling plate 240 and a screw tip 271 of the screw 272 protrudes from the first surface 244 of the levelling plate 240. According to various embodiments, the screw head 273a of the screw 272 may be entirely fitted into the sunken portion 266 of the second surface 246 of the levelling plate 240. According to various embodiments, the screw 272 may be a D-ring screw.

According to various embodiments, the screw 272 may include the screw head 273a, an unthreaded shank 273b extending from the screw head 273a, followed by a threaded portion 273c extending to the tip 271 of the screw 272. According to various embodiments, a major diameter of the threaded portion 273c may be larger than a diameter of the unthreaded shank 273b. According to various embodiments, the major diameter of the threaded portion 273c of the screw 272 is the diameter delimiting the height of the thread profile or an outside diameter of the threaded portion 273c of the screw 272. According to various embodiments, a diameter of the through-hole 262 forming the socket structure 260 of the levelling plate 240 may be larger than the major diameter of the threaded portion 273c of the screw 272.

According to various embodiments, the attachment assembly 270 may further include a retainer 274 having an aperture 275. According to various embodiments, the retainer 274 may be placed over the opening of the through-hole 262 at the first surface 244 of the levelling plate 240. According to various embodiments, the retainer 274 may be a thin plate with the aperture 275 in the middle. According to various embodiments, the retainer 274 may be placed in the first recess 264 surrounding the aperture of the through-hole 262 at the first surface 244 of the levelling plate 240. According to various embodiments, the shape of the first recess 264 may correspond to the shape of the retainer 274. According to various embodiments, the retainer 274 may be a circular shape or a square shape. According to various embodiments, the retainer 274 may include a semi-flexible ring with open ends that can be snapped into place. According to various embodiments, the retainer 274 may include, but not limited to, a circlip, a C-clip, a Seeger ring, a snap ring or a retaining ring.

According to various embodiments, the retainer 274 may be loosely coupled to the screw 272 with the aperture 275 of the retainer 274 loosely surrounding the unthreaded shank 273b of the screw 272 in a manner such that the retainer 274 may be between the threaded portion 273c of the screw 272 and the first surface 244 of the levelling plate 240. Accordingly, the screw 272 may be coupled to the levelling plate 240 with the screw head 273a of the screw 272 abutting the second surface 246 of the levelling plate 240, the unthreaded shank 273b of the screw 272 extending through the through-hole 262 of the levelling plate 240, and the retainer 274 loosely surrounding the unthreaded shank 273b of the screw 272 and abutting the first surface 244 of the levelling plate 240.

According to various embodiments, the major diameter of the threaded portion 273c of the screw 272 may be larger than a diameter of the aperture 275 of the retainer 274. Accordingly, with the retainer 274 loosely surrounding the unthreaded shank 273b of the screw 272 between the threaded portion 273c of the screw 272 and the first surface 244 of the levelling plate 240, the retainer 274 may serve as a stopper to prevent the threaded portion 273c of the screw 272 from withdrawing into the through-hole 262 of the levelling plate 240. Hence, the retainer 274 may prevent the screw 272 from sliding out the through-hole 262 of the levelling plate 240. According to various embodiments, the retainer 274 may block a thread runout section of the threaded portion 273c of the screw 272 and the first surface 244 of the levelling plate 240 may block the retainer 274 such that the screw 272 may be prevented to move axially. However, since the retainer 274 is loosely surrounding the unthreaded shank 273b of the screw 272, the screw 272 may be permitted to rotate about its axis. According to various embodiments, the thread runout section of the threaded portion 273c of the screw 272 may be a transition between the threaded portion 273c and the unthreaded shank 273b of the screw 272.

According to various embodiments, the attachment assembly 270 may further include an anti-skid pad 276 having a through-hole 277. According to various embodiments, the anti-skid pad 276 may be placed over the retainer 274. According to various embodiments, the anti-skid pad 276 may be larger than the retainer 274 and may cover the entire retainer 274 as well as partially cover the first surface 244 of the levelling plate 240. According to various embodiments, the through-hole 277 of the anti-skid pad 276 may be aligned to the through-hole 262 of the levelling plate 240 such that the screw tip 271 of the screw 272 may be inserted through the through-hole 277 of the anti-skid pad 276. According to various embodiments, the screw tip 271 of the screw 272 may protrude from the anti-skid pad 276 as shown in FIG. 2C. According to various embodiments, the anti-skid pad 276 may be attached to the levelling plate 240. According to various embodiments, the anti-skid pad 276 may be attached via adhesive.

As shown in FIG. 2D and FIG. 2E, the camera 206, as an example of the peripheral device, may be attached to the levelling plate 240 of the mount 200 by screwing the screw tip 271 of the screw 272, which is protruding from the anti-skid pad 276 on the first surface 244 of the levelling plate 240, into the camera 206. As shown in FIG. 2F and FIG. 2G, the camera 206, as an example of the peripheral device, may include an internal screw thread 207 such that the screw tip 271 of the screw 272 may be screwed into the camera 206. According to various embodiments, by screwing the screw tip 271 of the screw 272 into the camera 206, the screw head 273a of the screw 272 and the camera 206 may sandwich the levelling plate 240 so as to secure or fasten or attach the camera 206 to the levelling plate 240 of the mount 200.

As shown in FIG. 2H, the camera 206 (as an example of the peripheral device), which is attached to the levelling plate 240, may be tilted with respect to the first plate 210 of the mount 200 via pivoting the levelling plate 240 with respect to the first plate 210 about the second hinged joint 250. Accordingly, when the mount 200 is mounted to a monitor or when the mount 200 is placed on a surface, the angle of the camera 206 may be tilted by pivoting the levelling plate 240 with respect to the first plate 210.

Figure 3A:
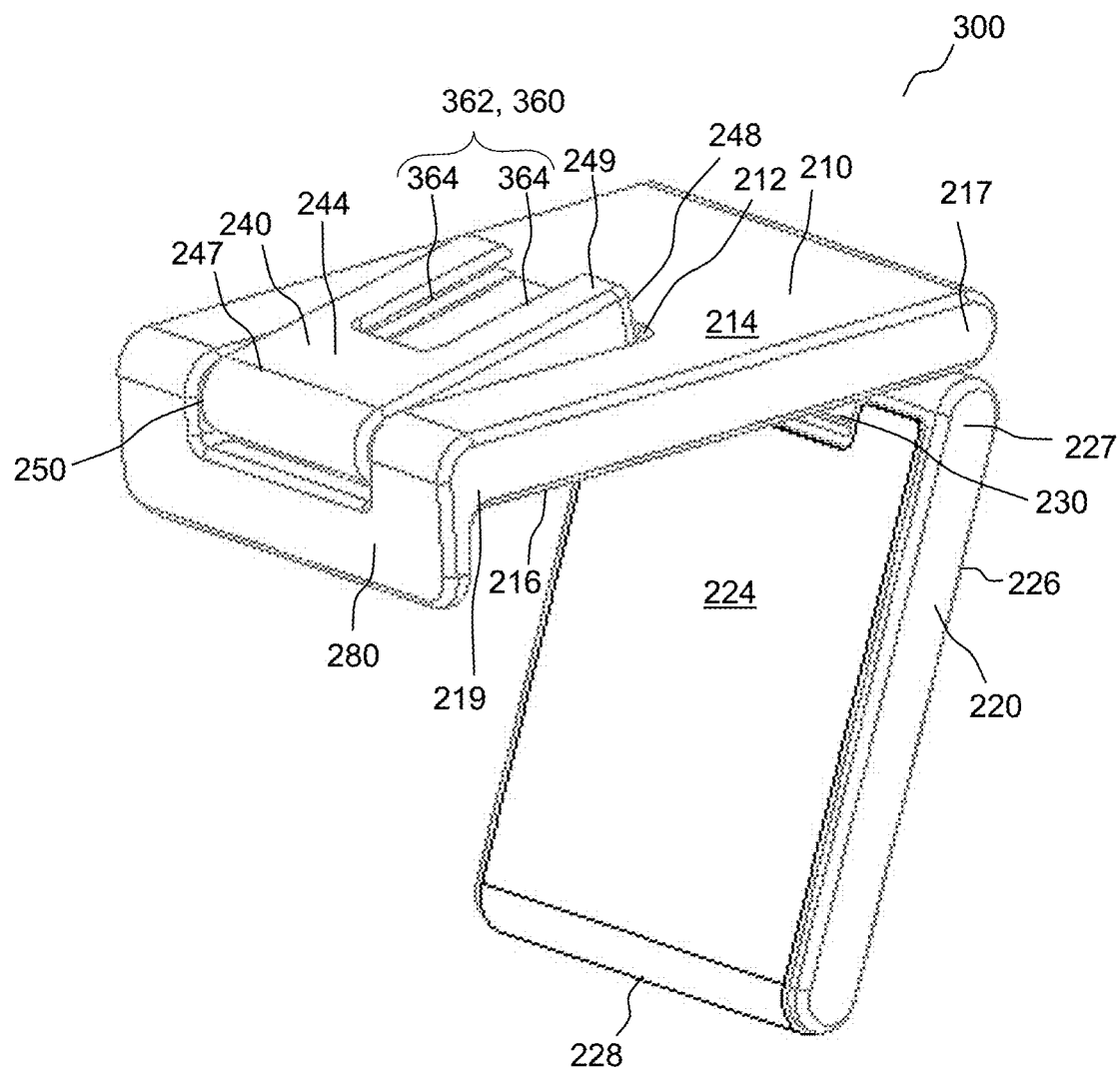
FIG. 3A shows a mount for a camera according to various embodiments.
Figure 3B:
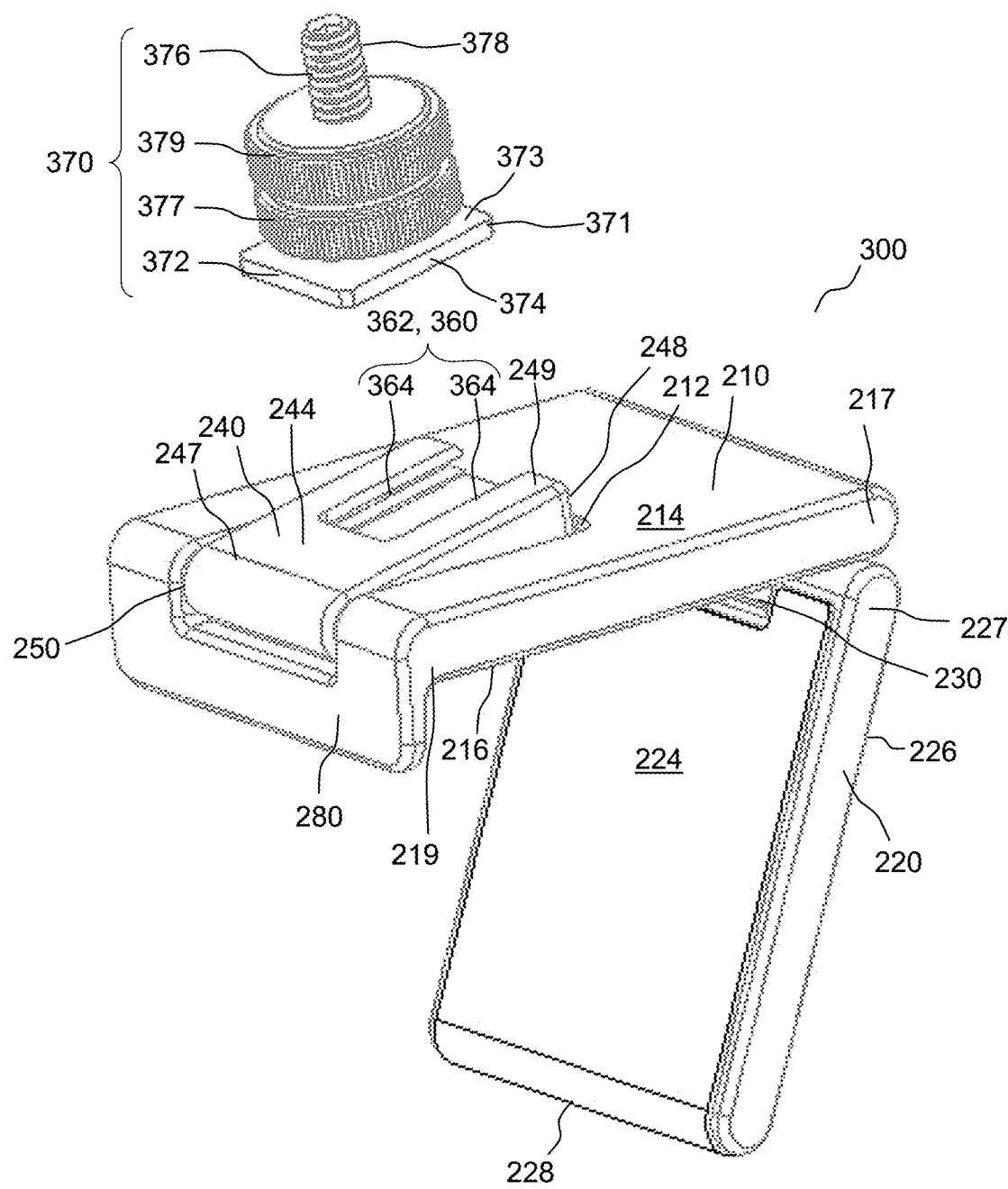
FIG. 3B shows the mount of FIG. 3A having an attachment assembly in an unassembled state according to various embodiments.
Figure 3D:
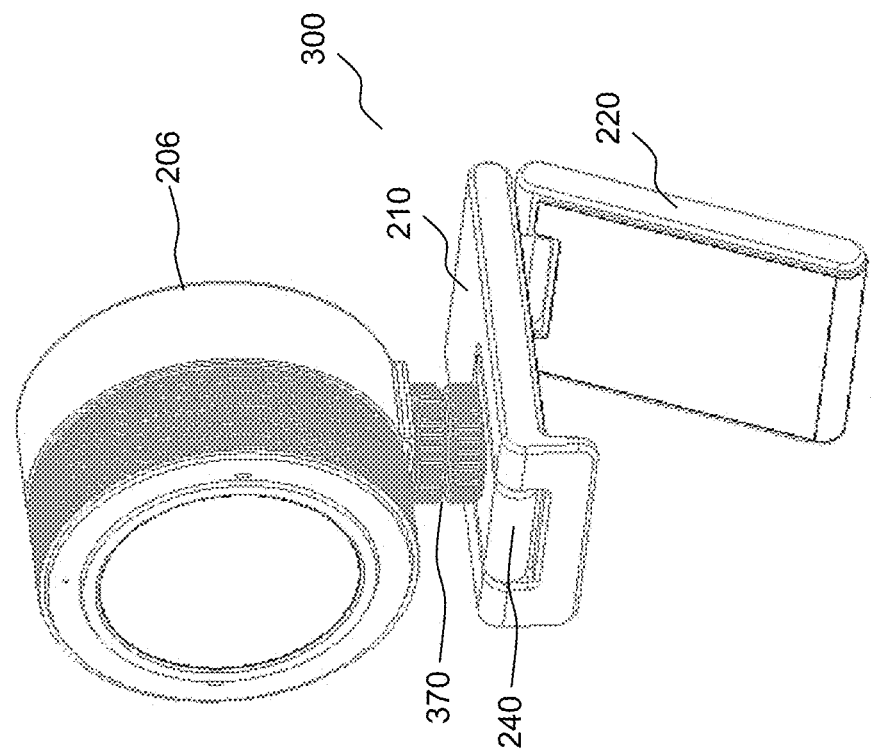
FIG. 3D shows the mount of FIG. 3A having the attachment assembly with the camera attached to the mount according to various embodiments.
Figure 3C:
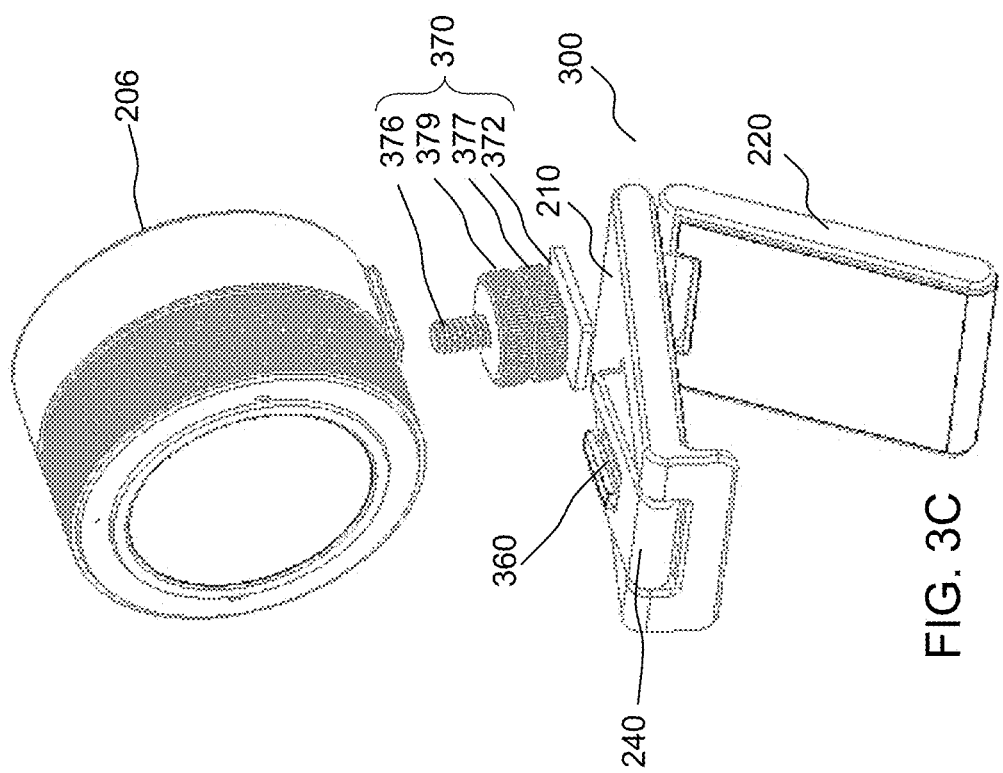
FIG. 3C shows the mount of FIG. 3A, the attachment assembly and the camera prior to being connected together according to various embodiments.
Figure 3F:
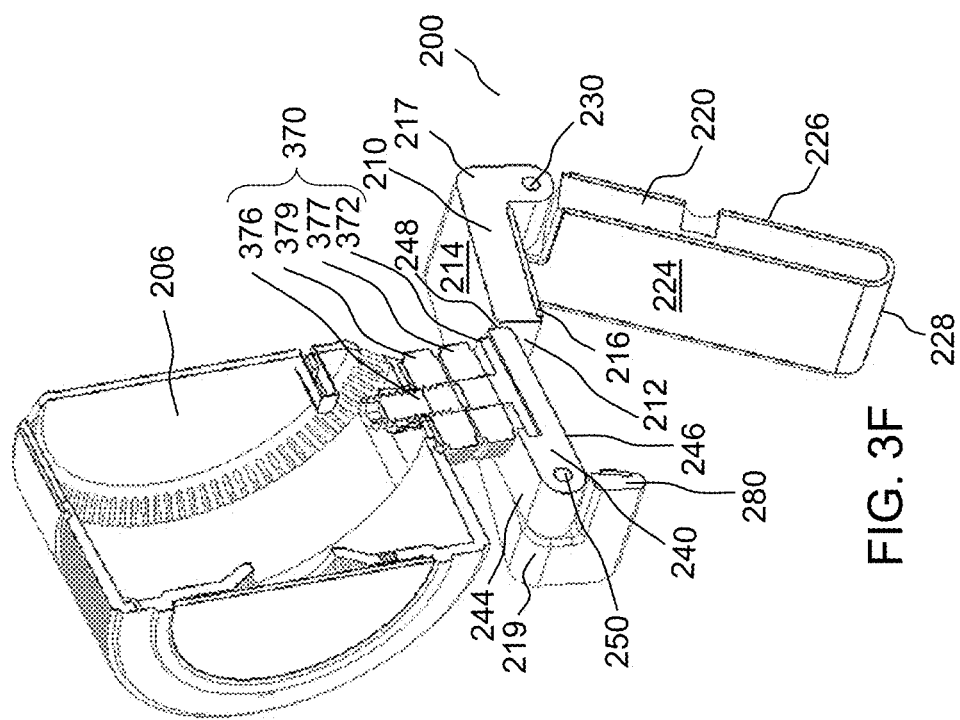
FIG. 3F shows a cross-sectional side view of FIG. 3D according to various embodiments.
Figure 3E:
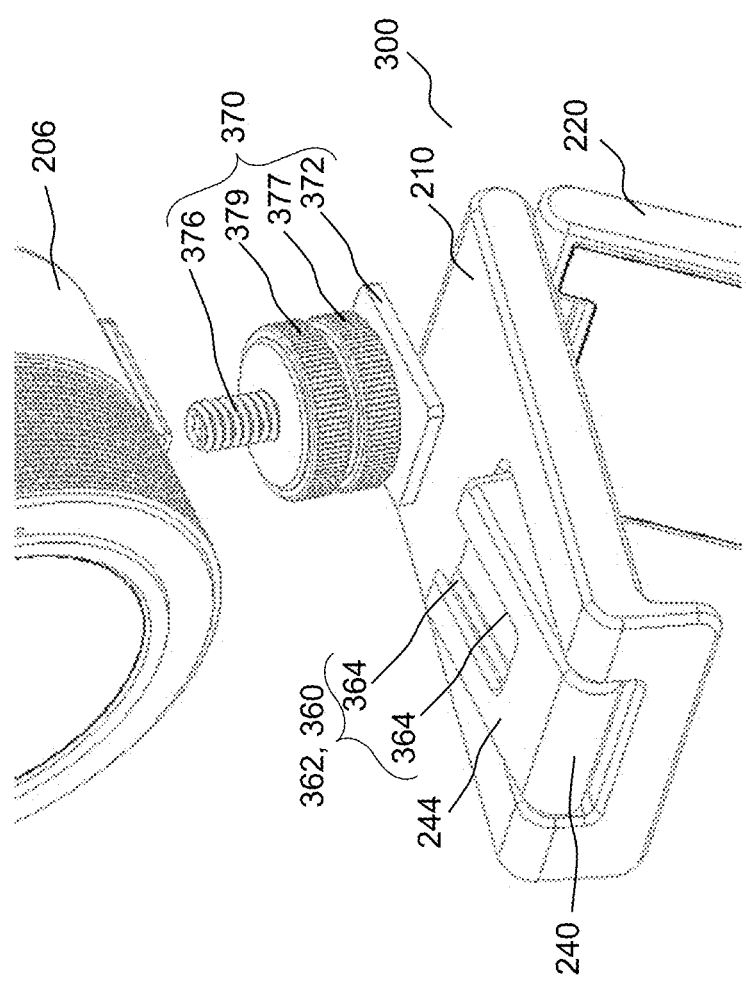
FIG. 3E shows an enlarged view zoomed in to the attachment assembly prior to connecting to the camera and the mount according to various embodiments.

FIG. 3A shows a mount 300 for a peripheral device according to various embodiments. FIG. 3B shows the mount 300 having an attachment assembly 370 in an unassembled state according to various embodiments. FIG. 3C shows the mount 300, the attachment assembly 370 and the camera 206 (as an example of the peripheral device) prior to being connected together according to various embodiments. FIG. 3D shows the mount 300 having the attachment assembly 370 with the camera 206 (as an example of the peripheral device) attached to the mount 300 according to various embodiments. FIG. 3E shows an enlarged view zoomed in to the attachment assembly 370 prior to connecting to the camera 206 (as an example of the peripheral device) and the mount 300 according to various embodiments. FIG. 3F shows a cross-sectional side view of FIG. 3D according to various embodiments.

According to various embodiments, the mount 300 of FIG. 3A to FIG. 3F may be a variant of the mount 200 of FIG. 2A to FIG. 2H. Accordingly, the mount 300 of FIG. 3A to FIG. 3F may contain all the features of the mount 200 of FIG. 2A to FIG. 2H. Accordingly, all features, changes, modifications, and variations that are applicable to the mount 200 of FIG. 2A to FIG. 2H may also be applicable to the mount 300 of FIG. 3A to FIG. 3F. According to various embodiments, the mount 300 of FIG. 3A to FIG. 3F may differ from mount 200 of FIG. 2A to FIG. 2H in that the mount 300 of FIG. 3A to FIG. 3F has a different type of socket structure 360 at the levelling plate 240 and a different type of attachment assembly 370.

According to various embodiments, the socket structure 360 of the levelling plate 240 of the mount 300 may include a cold-shoe bracket 362 at the first surface 244 of the levelling plate 240. According to various embodiments, the cold-shoe bracket 362 may include a pair of parallel opposing grooves 364. According to various embodiments, the cold-shoe bracket 362 may be integrally formed or molded or casted or machined with the levelling plate 240 such that the cold-shoe bracket 362 and the levelling plate 240 may form a single unitary piece (for example as shown in FIG. 3A). According to various embodiments, the cold-shoe bracket 362 may be cut or set or recessed into the first surface 244 of the levelling plate 240. According to various embodiments (not shown), the cold-shoe bracket 362 and the levelling plate 240 may be separate pieces that are integrally joined or connected together, whereby the cold-shoe bracket 362 may be attached on the first surface 244 of the levelling plate 240. According to various embodiments, the cold-shoe bracket 362 of the socket structure 360 may receive the attachment assembly 370 for attaching the peripheral device (e.g. the camera 206) to the levelling plate 240.

According to various embodiments, the mount 300 may include the attachment assembly 370 fitted to the socket structure 360 of the levelling plate 240. According to various embodiments, the attachment assembly 370 may include a cold-shoe foot 372 in the form of a plate 371 with a pair of parallel edges 374 and a stud 376 protruding from a surface 373 of the cold-shoe foot 372. The stud 376 may include external screw thread 378. The stud 376 may be protruding perpendicularly from the surface 373 of the cold-shoe foot 372. According to various embodiments, the cold-shoe foot 372 may be fitted into the cold-shoe bracket 362 of the socket structure 360 with the pair of parallel edges 374 of the cold-shoe foot 372 slotted into the pair of parallel opposing grooves 364 of the cold-shoe bracket 362 and with the stud 376 protruding away from the first surface 244 of the levelling plate 240. Accordingly, the cold-shoe foot 372 may be slide into the cold-shoe bracket 362 with the pair of parallel edges 374 of the cold-shoe foot 372 in sliding engagement with the pair of parallel opposing grooves 364 of the cold-shoe bracket 362.

According to various embodiments, the attachment assembly 370 may include at least one nut 377 screwed onto the stud 376 protruding from the cold-shoe foot 372. According to various embodiments, as shown, the attachment assembly 370 may include two nuts 377, 379 screwed onto the stud 376 protruding from the cold-shoe foot 372. According to various embodiments, the first nut 377 may secure the attachment assembly 370 to the socket structure 360 of the levelling plate 240 by tightening towards the cold-shoe foot 372 of the attachment assembly 370 so as to clamp the cold-shoe bracket 362 between the cold-shoe foot 372 and the first nut 377. According to various embodiments, the second nut 379 may secure the peripheral device (e.g. the camera 206) to the attachment assembly 370 by tightening towards peripheral device so as to tightly abut the peripheral device to prevent loosening of the peripheral device from the stud 376.

As shown in FIG. 3D and FIG. 3F, the camera 206, as an example of the peripheral device, may be attached to the levelling plate 240 of the mount 300 by screwing the camera 206 onto the stud 376 of the attachment assembly 370.

According to various embodiments, the second nut 379 may be tighten towards the camera 206 so as to fix the camera 206 in place. As shown in FIG. 3F, the camera 206 (as an example of the peripheral device) may include an internal screw thread 207 such that the camera 206 may be screwed on to the stud 376 with the internal screw thread 207 of the camera engaging the external screw thread 378 of the stud 376.

As shown in FIG. 3F, the camera 206 (as an example of the peripheral device), which is attached to the levelling plate 240, may be tilted with respect to the first plate 210 of the mount 300 via pivoting the levelling plate 240 with respect to the first plate 210 about the second hinged joint 250. Accordingly, when the mount 300 is mounted to a monitor or when the mount 300 is placed on a surface, the angle of the camera 206 may be tilted by pivoting the levelling plate 240 with respect to the first plate 210 of the mount 300.

The following examples pertain to various embodiments.

Example 1 is a mount for a peripheral device, the mount including:

a first plate having an opening going all the way through from a first surface of the first plate to a second surface of the first plate, wherein the first surface and the second surface are opposite surfaces of the first plate;

a second plate coupled to the first plate via a first hinged joint in a manner so as to be pivotable between a closed configuration and an open configuration in a clam-shell like manner, whereby the second plate is closed onto the second surface of the first plate in the closed configuration and the second plate is pivoted away from the second surface of the first plate about the first hinged joint in the open configuration; and a levelling plate having a first surface and a second surface, the levelling plate being disposed in the opening of the first plate and coupled to the first plate via a second hinged joint in a manner so as to be pivotable between a flushed configuration and an angled-off configuration, whereby the first surface of the levelling plate is flushed with the first surface of the first plate in the flushed configuration and the levelling plate is pivoted away from the first surface of the first plate in the angled-off configuration, wherein the first hinged joint and the second hinged joint are parallel and are at opposite portions of the first plate, wherein a free end of the second plate in the closed configuration and a free end of the levelling plate in the flushed configuration are directed in opposite directions along the first plate, wherein the levelling plate includes a socket structure to receive an attachment assembly for attaching the peripheral device to the first surface of the levelling plate, wherein the first plate includes a lip portion protruding from the second surface of the first plate at an edge portion of the first plate opposite the first hinged joint.

In Example 2, the subject matter of Example 1 may optionally include that each of the first hinged joint and the second hinged joint may be configured to hold its angle or position in a manner so as to hold the second plate and the levelling plate respectively at desired angles with respect to the first plate.

In Example 3, the subject matter of Example 1 or 2 may optionally include that each of the first hinged joint and the second hinged joint may include a torque hinge, a friction hinge, a free-stop hinge or a ratchet hinge.

In Example 4, the subject matter of any one of Examples 1 to 3 may optionally include that the first plate may be of an elongated shape and the first hinged joint and the second hinged joint may be at two opposite longitudinal end portions of the first plate.

In Example 5, the subject matter of Example 4 may optionally include that the lip portion protruding from the second surface of the first plate may be at the longitudinal end portion of the first plate opposite the first hinged joint.

In Example 6, the subject matter of any one of Examples 1 to 5 may optionally include that a distance between the first hinged joint and the lip portion of the first plate may be equal or greater than a distance between the first hinged joint and the free end of the second plate.

In Example 7, the subject matter of any one of Examples 1 to 6 may optionally include that the levelling plate may have a shape corresponding to a shape of the opening in the first plate.

In Example 8, the subject matter of any one of Examples 1 to 7 may optionally include that the opening of the first plate is of a rectangular shape and the levelling plate is of a corresponding rectangular shape, and wherein a short-side portion of the levelling plate is coupled to the first plate via the second hinge joint.

In Example 9, the subject matter of any one of Examples 1 to 8 may optionally include that the socket structure of the levelling plate may include a through-hole extending from the first surface of the levelling plate to the second surface of the levelling plate.

In Example 10, the subject matter of Example 9 may optionally include the attachment assembly fitted to the socket structure of the levelling plate, the attachment assembly including a screw inserted through the through-hole from the second surface of the levelling plate to the first surface of the levelling plate such that a screw head of the screw may be abutting the second surface of the levelling plate.

In Example 11, the subject matter of Example 10 may optionally include that the attachment assembly may further include a retainer having an aperture, the retainer loosely coupled to the screw with the aperture of the retainer loosely surrounding an unthreaded shank of the screw in a manner such that the retainer is between a threaded portion of the screw and the first surface of the levelling plate; and an anti-skid pad having a through-hole, the anti-skid pad being placed over the retainer with the tip of the screw inserted through the through-hole of the anti-skid pad, wherein the anti-skid pad is attached to the levelling plate, wherein a major diameter of the threaded portion of the screw may be larger than a diameter of the aperture of the retainer such that the retainer may serve as a stopper to prevent the threaded portion of the screw from withdrawing into the through-hole of the levelling plate.

In Example 12, the subject matter of any one of Examples 1 to 8 may optionally include that the socket structure of the levelling plate may include a cold-shoe bracket at the first surface of the levelling plate, the cold-shoe bracket may include a pair of parallel opposing grooves.

In Example 13, the subject matter of Example 12 may optionally include the attachment assembly fitted to the socket structure of the levelling plate, the attachment assembly may include a cold-shoe foot in the form of a plate with a pair of parallel edges; and a stud protruding from a surface of the cold-shoe foot, wherein the stud has external screw thread, wherein the cold-shoe foot may be fitted into the cold-shoe bracket with the pair of parallel edges of the cold-shoe foot slotted into the pair of parallel opposing grooves of the cold-shoe bracket and with the stud protruding away from the first surface of the levelling plate.

In Example 14, the subject matter of Example 13 may optionally include that the attachment assembly may further include at least one nut screwed onto the stud.

In Example 15, the subject matter of Example 13 or 14 may optionally include that the attachment assembly may further include two nuts screwed onto the stud.

Various embodiments have provided a mount for a peripheral device which may be easily interchanged between serving as a monitor mount and a stand. Various embodiments have also provided a mount which allows easy tilting of the peripheral device with respect to the mount when used as the monitor mount or as the stand. Various embodiments have provided a versatile and effective mount for a peripheral device to facilitate quick interchanging of positioning and mounting of the peripheral device.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A mount for a peripheral device, the mount comprising:
a first plate having an opening going all the way through from a first surface of the first plate to a second surface of the first plate, wherein the first surface and the second surface are opposite surfaces of the first plate;
a second plate coupled to the first plate via a first hinged joint in a manner so as to be pivotable between a closed configuration and an open configuration in a clam-shell like manner, whereby the second plate is closed onto the second surface of the first plate in the closed configuration and the second plate is pivoted away from the second surface of the first plate about the first hinged joint in the open configuration; and
a levelling plate having a first surface and a second surface, the levelling plate being disposed in the opening of the first plate and coupled to the first plate via a second hinged joint in a manner so as to be pivotable between a flushed configuration and an angled-off configuration, whereby the first surface of the levelling plate is flushed with the first surface of the first plate in the flushed configuration and the levelling plate is pivoted away from the first surface of the first plate in the angled-off configuration,
wherein the first hinged joint and the second hinged joint are parallel and are at opposite portions of the first plate, wherein a free end of the second plate in the closed configuration and a free end of the levelling plate in the flushed configuration are directed in opposite directions along the first plate,
wherein the levelling plate comprises a socket structure to receive an attachment assembly for attaching the peripheral device to the first surface of the levelling plate,
wherein the first plate comprises a lip portion protruding from the second surface of the first plate at an edge portion of the first plate opposite the first hinged joint.

2. The mount as claimed in claim 1, wherein each of the first hinged joint and the second hinged joint is configured to hold its angle or position in a manner so as to hold the second plate and the levelling plate respectively at desired angles with respect to the first plate.

3. The mount as claimed in claim 2, wherein each of the first hinged joint and the second hinged joint comprises a torque hinge, a friction hinge, a free-stop hinge or a ratchet hinge.

4. The mount as claimed in claim 1, wherein the first plate is of an elongated shape and the first hinged joint and the second hinged joint are at two opposite longitudinal end portions of the first plate.

5. The mount as claimed in claim 1, wherein the levelling plate has a shape corresponding to a shape of the opening in the first plate.

6. The mount as claimed in claim 5, wherein the opening of the first plate is of a rectangular shape and the levelling plate is of a corresponding rectangular shape, and wherein a short-side portion of the levelling plate is coupled to the first plate via the second hinge joint.

7. The mount as claimed in claim 1, wherein the socket structure of the levelling plate comprises a through-hole extending from the first surface of the levelling plate to the second surface of the levelling plate.

8. The mount as claimed in claim 7, further comprising the attachment assembly fitted to the socket structure of the levelling plate, the attachment assembly comprises
a screw inserted through the through-hole from the second surface of the levelling plate to the first surface of the levelling plate such that a screw head of the screw is abutting the second surface of the levelling plate,
a retainer having an aperture, the retainer loosely coupled to the screw with the aperture of the retainer loosely surrounding an unthreaded shank of the screw in a manner such that the retainer is between a threaded portion of the screw and the first surface of the levelling plate, and
an anti-skid pad having a through-hole, the anti-skid pad being placed over the retainer with the tip of the screw inserted through the through-hole of the anti-skid pad, wherein the anti-skid pad is attached to the levelling plate,
wherein a major diameter of the threaded portion of the screw is larger than a diameter of the aperture of the retainer such that the retainer serves as a stopper to prevent the threaded portion of the screw from withdrawing into the through-hole of the levelling plate.

9. The mount as claimed in claim 1, wherein the socket structure of the levelling plate comprises a cold-shoe bracket at the first surface of the levelling plate, the cold-shoe bracket comprises a pair of parallel opposing grooves.

10. The mount as claimed in claim 9, further comprising the attachment assembly fitted to the socket structure of the levelling plate, the attachment assembly comprises
a cold-shoe foot in the form of a plate with a pair of parallel edges, and
a stud protruding from a surface of the cold-shoe foot, wherein the stud has external screw thread,
wherein the cold-shoe foot is fitted into the cold-shoe bracket with the pair of parallel edges of the cold-shoe foot slotted into the pair of parallel opposing grooves of the cold-shoe bracket and with the stud protruding away from the first surface of the levelling plate.

11. A mount for a peripheral device, the mount comprising:
a first plate having an opening going all the way through from a first surface of the first plate to a second surface of the first plate, wherein the first surface and the second surface are opposite surfaces of the first plate;
a second plate coupled to the first plate via a first hinged joint in a manner so as to be pivotable between a closed configuration and an open configuration in a clam-shell like manner, whereby the second plate is closed onto the second surface of the first plate in the closed configuration and the second plate is pivoted away from the second surface of the first plate about the first hinged joint in the open configuration; and a levelling plate having a first surface and a second surface, the levelling plate being disposed in the opening of the first plate and coupled to the first plate via a second hinged joint in a manner so as to be pivotable between a flushed configuration and an angled-off configuration, whereby the first surface of the levelling plate is flushed with the first surface of the first plate in the flushed configuration and the levelling plate is pivoted away from the first surface of the first plate in the angled-off configuration, wherein the first hinged joint and the second hinged joint are parallel and are at opposite portions of the first plate, wherein a free end of the second plate in the closed configuration and a free end of the levelling plate in the flushed configuration are directed in opposite directions along the first plate, wherein the levelling plate comprises a socket structure to receive an attachment assembly for attaching the peripheral device to the first surface of the levelling plate, wherein the socket structure comprises a through-hole extending from the first surface of the levelling plate to the second surface of the levelling plate or a cold-shoe bracket at the first surface of the levelling plate, the cold-shoe bracket comprises a pair of parallel opposing grooves.

12. The mount as claimed in claim 11, wherein each of the first hinged joint and the second hinged joint is configured to hold its angle or position in a manner so as to hold the second plate and the levelling plate respectively at desired angles with respect to the first plate.

13. The mount as claimed in claim 11, wherein the levelling plate has a shape corresponding to a shape of the opening in the first plate.

14. The mount as claimed in claim 11, further comprising the attachment assembly fitted to the socket structure of the levelling plate, wherein, when the socket structure comprises the through-hole extending from the first surface of the levelling plate to the second surface of the levelling plate, the attachment assembly comprises a screw inserted through the through-hole from the second surface of the levelling plate to the first surface of the levelling plate such that a screw head of the screw is abutting the second surface of the levelling plate, a retainer having an aperture, the retainer loosely coupled to the screw with the aperture of the retainer loosely surrounding an unthreaded shank of the screw in a manner such that the retainer is between a threaded portion of the screw and the first surface of the levelling plate, and an anti-skid pad having a through-hole, the anti-skid pad being placed over the retainer with the tip of the screw inserted through the through-hole of the anti-skid pad, wherein the anti-skid pad is attached to the levelling plate, wherein a major diameter of the threaded portion of the screw is larger than a diameter of the aperture of the retainer such that the retainer serves as a stopper to prevent the threaded portion of the screw from withdrawing into the through-hole of the levelling plate.

15. The mount as claimed in claim 11, further comprising the attachment assembly fitted to the socket structure of the levelling plate, wherein, when the socket structure comprises the cold-shoe bracket at the first surface of the levelling plate, the attachment assembly comprises a cold-shoe foot in the form of a plate with a pair of parallel edges, and a stud protruding from a surface of the cold-shoe foot, wherein the stud has external screw thread, wherein the cold-shoe foot is fitted into the cold-shoe bracket with the pair of parallel edges of the cold-shoe foot slotted into the pair of parallel opposing grooves of the cold-shoe bracket and with the stud protruding away from the first surface of the levelling plate.

16. A mount for a peripheral device, the mount comprising:

a first plate having an opening going all the way through from a first surface of the first plate to a second surface of the first plate, wherein the first surface and the second surface are opposite surfaces of the first plate;

a second plate coupled to the first plate via a first hinged joint in a manner so as to be pivotable between a closed configuration and an open configuration in a clam-shell like manner, whereby the second plate is closed onto the second surface of the first plate in the closed configuration and the second plate is pivoted away from the second surface of the first plate about the first hinged joint in the open configuration;

a levelling plate having a first surface and a second surface, the levelling plate having a shape corresponding to a shape of the opening in the first plate, the levelling plate having a socket structure, the levelling plate being disposed in the opening of the first plate and coupled to the first plate via a second hinged joint in a manner so as to be pivotable between a flushed configuration and an angled-off configuration, whereby the first surface of the levelling plate is flushed with the first surface of the first plate in the flushed configuration and the levelling plate is pivoted away from the first surface of the first plate in the angled-off configuration; and an attachment assembly fitted to the socket structure of the levelling plate in a manner so as to be coupleable with the peripheral device for attaching the peripheral device to the first surface of the levelling plate, wherein the first hinged joint and the second hinged joint are parallel and are at opposite portions of the first plate, wherein a free end of the second plate in the closed configuration and a free end of the levelling plate in the flushed configuration are directed in opposite directions along the first plate.

17. The mount as claimed in claim 16, wherein each of the first hinged joint and the second hinged joint is configured to hold its angle or position in a manner so as to hold the second plate and the levelling plate respectively at desired angles with respect to the first plate.

18. The mount as claimed in claim 16, wherein the opening of the first plate is of a rectangular shape and the levelling plate is of a corresponding rectangular shape, and wherein a short-side portion of the levelling plate is coupled to the first plate via the second hinge joint.

19. The mount as claimed in claim 16, wherein the socket structure of the levelling plate comprises a through-hole extending from the first surface of the levelling plate to the second surface of the levelling plate, wherein the attachment assembly comprises
a screw inserted through the through-hole from the second surface of the levelling plate to the first surface of the levelling plate such that a screw head of the screw is abutting the second surface of the levelling plate,
a retainer having an aperture, the retainer loosely coupled to the screw with the aperture of the retainer loosely surrounding an unthreaded shank of the screw in a manner such that the retainer is between a threaded portion of the screw and the first surface of the levelling plate, and
an anti-skid pad having a through-hole, the anti-skid pad being placed over the retainer with the tip of the screw inserted through the through-hole of the anti-skid pad, wherein the anti-skid pad is attached to the levelling plate,
wherein a major diameter of the threaded portion of the screw is larger than a diameter of the aperture of the retainer such that the retainer serves as a stopper to prevent the threaded portion of the screw from withdrawing into the through-hole of the levelling plate.

20. The mount as claimed in claim 16,
wherein the socket structure of the levelling plate comprises a cold-shoe bracket at the first surface of the levelling plate, the cold-shoe bracket comprises a pair of parallel opposing grooves,
wherein the attachment assembly comprises
a cold-shoe foot in the form of a plate with a pair of parallel edges, and
a stud protruding from a surface of the cold-shoe foot, wherein the stud has external screw thread,
wherein the cold-shoe foot is fitted into the cold-shoe bracket with the pair of parallel edges of the cold-shoe foot slotted into the pair of parallel opposing grooves of the cold-shoe bracket and with the stud protruding away from the first surface of the levelling plate.

\* \* \* \* \*